US011755014B2

(12) United States Patent
Urtasun et al.

(10) Patent No.: US 11,755,014 B2
(45) Date of Patent: Sep. 12, 2023

(54) JOINTLY LEARNABLE BEHAVIOR AND TRAJECTORY PLANNING FOR AUTONOMOUS VEHICLES

(71) Applicant: UATC, LLC, San Francisco, CA (US)

(72) Inventors: Raquel Urtasun, Toronto (CA); Abbas Sadat, Toronto (CA); Mengye Ren, Toronto (CA); Andrei Pokrovsky, San Francisco, CA (US); Yen-Chen Lin, Cambridge, MA (US); Ersin Yumer, Burlingame, CA (US)

(73) Assignee: UATC, LLC, Mountain View, CA (US)

( * ) Notice: Subject to any disclaimer, the term of this patent is extended or adjusted under 35 U.S.C. 154(b) by 467 days.

(21) Appl. No.: 16/825,049

(22) Filed: Mar. 20, 2020

(65) Prior Publication Data

US 2021/0200212 A1 Jul. 1, 2021

Related U.S. Application Data

(60) Provisional application No. 62/955,708, filed on Dec. 31, 2019.

(51) Int. Cl.
*G05D 1/02* (2020.01)
*G05D 1/00* (2006.01)

(52) U.S. Cl.
CPC ......... *G05D 1/0088* (2013.01); *G05D 1/0214* (2013.01); *G05D 1/0221* (2013.01); *G05D 2201/0213* (2013.01)

(58) Field of Classification Search
CPC .. G05D 1/0088; G05D 1/0214; G05D 1/0221; G05D 2201/0213; B60W 60/0011;
(Continued)

(56) References Cited

U.S. PATENT DOCUMENTS

2019/0086925 A1* 3/2019 Fan ..................... G05D 1/0212
2020/0033869 A1* 1/2020 Palanisamy ......... B60W 60/001
(Continued)

OTHER PUBLICATIONS

Sadat et al., Jointly Learnable Behavior and Trajectory Planning for Self-Driving Vehicles, Oct. 10, 2019, 2019 International Conference on Intelligent Robots and Systems (IROS) (Year: 2019).*
(Continued)

*Primary Examiner* — Nadeem Odeh
(74) *Attorney, Agent, or Firm* — Dority & Manning, P.A.

(57) ABSTRACT

Systems and methods for generating motion plans for autonomous vehicles are provided. An autonomous vehicle can include a machine-learned motion planning system including one or more machine-learned models configured to generate target trajectories for the autonomous vehicle. The model(s) include a behavioral planning stage configured to receive situational data based at least in part on the one or more outputs of the set of sensors and to generate behavioral planning data based at least in part on the situational data and a unified cost function. The model(s) includes a trajectory planning stage configured to receive the behavioral planning data from the behavioral planning stage and to generate target trajectory data for the autonomous vehicle based at least in part on the behavioral planning data and the unified cost function.

20 Claims, 14 Drawing Sheets

(58) Field of Classification Search
CPC . B60W 2050/0013; B60W 2050/0025; B60W 2554/801; B60W 2554/802; B60W 2556/50

See application file for complete search history.

(56) References Cited

U.S. PATENT DOCUMENTS

2020/0089245 A1* 3/2020 Yadmellat .......... B60W 60/0011
2020/0150671 A1* 5/2020 Fan ...................... G05D 1/0221

OTHER PUBLICATIONS

Zivot, Introduction to Computational Finance and Financial Econometrics—Matrix Algebra Review, 2015, University of Washington (Year: 2015).*

Ajanovic et al., "Search-based Optimal Motion Planning for Automated Driving", IEEE/RSJ International Conference on Intelligent Robots and Systems. Oct. 1-5, 2018, Madrid, Spain, pp. 1-9.

Bender, et al., "The Combinatorial Aspect of Motion Planning: Maneuver Variants in Structured Environments", IEEE Intelligent Vehicles Symposium, Jun. 28-Jul. 1, 2015, Seoul, South Korea, pp. 1-8.

Fan et al., "Baidu Apollo EM Motion Planner", arXiv:1807.08048v1, Jul. 20, 2018, 15 pages.

Pomerleau, "ALVINN: an Autonomous Land Vehicle in a Neural Network", Proceedings of Advances in Neural Information Processing Systems 1, Morgan Kaufmann Publishers Inc., San Francisco, CA, Jan. 1989, 9 pages.

Schlechtriemen et al., "Wiggling Through Complex Traffic: Planning Trajectories Constrained by Predictions", 2016 IEEE Intelligent Vehicles Symposium (IV), Jun. 19-22, 2016, Gothenburg, Sweden, pp. 1-9.

Werling et al., "Optimal Trajectory Generation for Dynamic Street Scenarios in a Frenet Frame", IEEE International Conference on Robotics and Automation, May 3-8, 2010, Anchorage, Alaska, pp. 987-993.

Zeng et al., "End-to-end Interpretable Neural Motion Planner", IEEE Conference on Computer Vision and Pattern Recognition, Jun. 16-20, 2019, Long Beach, CA, 10 pages.

Ziegler et al., "Spatiotemporal State Lattices for Fast Trajectory Planning in Dynamic on-Road Driving Scenarios", IEEE/RSJ International Conference on Intelligent Robots and Systems, Oct. 11-15, 2009, St. Louis, Missouri, pp. 1879-1884.

Ziegler et al., "Trajectory Planning for BERTHA—a Local, Continuous Method", 2014 IEEE Intelligent Vehicle Symposium (IV), Jun. 8-11, 2014, Dearborn, Michigan, 9 pages.

Bagnell et al., "Maximum Margin Planning", 23$^{rd}$ International Conference on Machine Learning, Jun. 25-29, 2006, 11 pages.

Bansal et al., "ChaufferNet: Learning to Drive by Imitating the Best and Synthesizing the Worst", arXiv:1812.03079v1, Dec. 7, 2018, 20 pages.

Bojarski et al., "End to End Learning for Self-Driving Cars", arXiv:1604.07316v1, Apr. 25, 2016, 9 pages.

Codevilla et al., "End-to-end Driving via Conditional Imitation Learning", IEEE International Conference on Robotics and Automation, May 21-28, 2018, Brisbane, Australia, 9 pages.

Fan et al., "An Auto-tuning Framework for Autonomous Vehicles", arXiv:1808.04913v1, Aug. 14, 2018, 7 pages.

Fan et al., "Baidu Apollo EM Motion Planner", arXiv:1807.080481, Jul. 20, 2018, 15 pages.

Gu et al., "On-Road Trajectory Planning for General Autonomous Driving with Enhanced Tunability", International Conference Intelligent Autonomous Systems, Jul. 15-18, 2014, Padova, Italy, pp. 1-13.

Kendall et al., "Learning to Drive in a Day", arXiv:1807.00412v2, Sep. 11, 2018, 7 pages.

McNaughton et al., "Motion Planning for Autonomous Driving with a Conformal Spatiotemporal Lattice", Proceedings of International Conference on Robotics and Automation, May 9-13, 2011, Shanghai, China, pp. 4889-4895.

Muller et al., "Driving Policy Transfer via Modularity and Abstraction", arXiv:1804.09364v3, Dec. 13, 2018, 15 pages.

Pan et al., "Virtual to Real Reinforcement Learning for Autonomous Driving", arXiv:1704.03952v4, Sep. 26, 2017, 13 pages.

Paxton et al., "Combining Neural Networks and Tree Search for Task and Motion Planning in Challenging Environments", arXiv:1703.07887v1, Mar. 22, 2017, 8 pages.

Pivtoraiko et al., "Differentially Constrained Mobile Robot Motion Planning in State Lattices", Journal of Field Robotics, vol. 26, No. 3, Mar. 2009, pp. 1-12.

Rhinehart et al., "R2P2: a ReparameteRized Pushforward Policy for Diverse, Precise Generative Path Forecasting", European Conference on Computer Vision, Sep. 8-14, 2018, Munich, Germany, 17 pages.

Schlechtriemen et al., "Wiggling Through Complex Traffic: Planning Trajectories Constrained by Predictions", 2016 IEEE Intelligent Vehicles Symposium (TV), Jun. 19-22, 2016, Gothenburg, Sweden, pp. 1-9.

Shalev-Shwartz et al., "On a Formal Model of Safe and Scalable Self-driving Cars", arXiv:1708.06374v4, Dec. 18, 2017, 33 pages.

Werbos, "Backpropagation Through Time: What It Does and How to Do It", Proceedings of the IEEE, vol. 78, No. 10, Nov. 1990, pp. 1550-1560.

Ziegler et al., "Trajectory Planning for BERTHA—a Local, Continuous Method", 2014 IFEE Intelligent Vehicle Symposium (IV), Jun. 8-11, 2014, Dearborn, Michigan, 9 pages.

* cited by examiner

JOINTLY LEARNABLE BEHAVIOR AND TRAJECTORY PLANNING FOR AUTONOMOUS VEHICLES

RELATED APPLICATION

This application claims priority to and the benefit of U.S. Provisional Patent Application No. 62/955,708, titled "Jointly Learnable Behavior and Trajectory Planning for Autonomous Vehicles," and filed on Dec. 31, 2019. U.S. Provisional Patent Application No. 62/955,708 is hereby incorporated by reference herein in its entirety.

FIELD

The present disclosure relates generally to improving the ability of computing devices to plan motion paths for autonomous vehicles.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path for navigating through such surrounding environment.

SUMMARY

Aspects and advantages of embodiments of the present disclosure will be set forth in part in the following description, or may be learned from the description, or may be learned through practice of the embodiments.

One example aspect of the present disclosure is directed to an autonomous vehicle including a set of sensors configured to generate one or more outputs based at least in part on an environment external to the autonomous vehicle one or more processors, and one or more non-transitory computer-readable media that collectively store a machine-learned motion planning system including one or more machine-learned models configured to generate target trajectories for the autonomous vehicle. The machine-learned motion planning system includes a behavioral planning stage configured to receive situational data based at least in part on the one or more outputs of the set of sensors and to generate behavioral planning data based at least in part on the situational data and a unified cost function. The machine-learned motion planning system includes a trajectory planning stage configured to receive the behavioral planning data from the behavioral planning stage and to generate target trajectory data for the autonomous vehicle based at least in part on the behavioral planning data and the unified cost function. The one or more non-transitory computer-readable media collectively store instructions that, when executed by the one or more processors, cause the one or more processors to perform operations. The operations include obtaining the situational data associated with the environment external to the autonomous vehicle, generating, using the behavioral planning stage of the machine-learned motion planning system, behavioral planning data indicative of at least one behavioral planning decision based at least in part on the situational data and the unified cost function, and generating, using the trajectory planning stage of the machine-learned motion planning system, target trajectory data indicative of at least one target trajectory based at least in part on the behavioral planning data and the unified cost function.

Another example aspect of the present disclosure is directed to a computer-implemented method of motion planning for an autonomous vehicle. The method includes obtaining, by a computing system comprising one or more computing devices, situational data associated with an environment detected by one or more sensors of the autonomous vehicle, generating, by the computing system using a behavioral planning stage and a unified cost function of a machine-learned motion planning system, data indicative of at least one behavioral decision for the autonomous vehicle based at least in part on the situational data, generating, by the computing system using a trajectory planning stage and the unified cost function of the machine-learned motion planning system, target trajectory data indicative of a target trajectory for the autonomous vehicle based at least in part on the data indicative of at least one behavioral decision for the autonomous vehicle, and generating, by the computing system, one or more motion plans based on the target trajectory.

Yet another example aspect of the present disclosure is directed to a computing system, including a machine-learned motion planning system configured to obtain situational data based at least in part on one or more outputs of a set of sensors of an autonomous vehicle and based at least in part on the situational data, generate a behavioral decision using a behavioral planning stage and output a target trajectory for the autonomous vehicle using a trajectory planning stage. The computing system includes one or more processors and one or more non-transitory computer-readable media that store instructions, that when executed by the one or more processors, cause the one or more processors to perform operations. The operations include inputting, to the machine-learned motion planning system, training data including annotated sensor data indicating ground truth vehicle trajectories determining a loss associated with one or more target trajectories generated by the machine-learned motion planning system relative to the annotated sensor data based at least in part on a combined loss function including a first loss component associated with the behavioral planning stage and a second loss component associated with the trajectory planning stage, and backpropagating the loss associated with the one or more target trajectories to the machine-learned motion planning system to jointly train the behavioral planning stage and the trajectory planning stage.

Other example aspects of the present disclosure are directed to systems, methods, vehicles, apparatuses, tangible, non-transitory computer-readable media, and memory devices for motion planning for autonomous vehicles.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
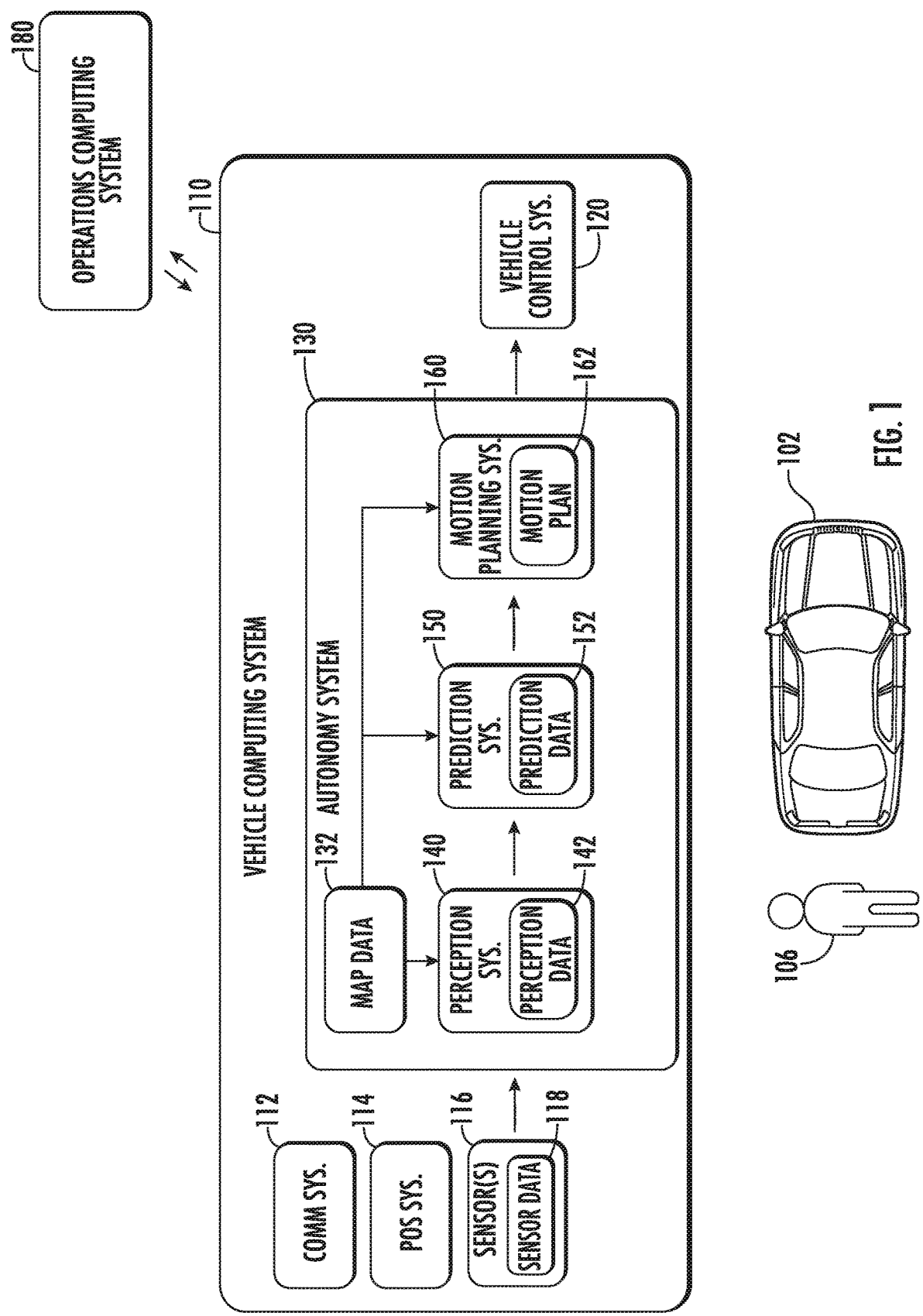
FIG. 1 depicts an example system overview including an autonomous vehicle according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally, the present disclosure is directed to improved systems and methods for motion planning in autonomous vehicles through the utilization of a machine-learned system that is jointly trained for both behavioral planning and trajectory planning. More particularly, a motion planning system for an autonomous vehicle is provided that includes one or more machine-learned models including a behavioral planning stage and a trajectory planning stage that share a unified cost function. Given a set of candidate behaviors and a set of candidate trajectories, the unified cost function can be configured to choose a particular behavior and a particular trajectory for the autonomous vehicle. The unified cost function can include a plurality of sub-costs that focus on different aspects of trajectories such as safety, comfort, feasibility, mission completion, and traffic rules. In some examples, the behavioral planning stage and the trajectory planning stage can be jointly trained using a combined loss function. The combined loss function can provide a framework of interpretable costs that can be jointly imposed on both the behavioral planning stage and the trajectory planning stage. In this manner, a data-driven motion planner can be provided that utilizes widely adapted and interpretable costing concepts for driving constraints. Moreover, the machine-learned motion planning system can be trained end to end so that both the behavioral planning stage and the trajectory planning stage can be trained with a common objective. Accordingly, a motion planning system is provided where overall behaviors of the autonomous vehicle are selected, and target trajectories are optimized based on a common objective as represented through a unified cost function. Additionally, a combined loss function can be used to train the motion planning system end-to-end so that the unified cost function is jointly optimized for both the behavioral planning stage and the trajectory planning stage.

An autonomous vehicle (e.g., ground-based vehicle, aircraft, etc.) can include various systems and devices configured to control the operation of the vehicle. For example, an autonomous vehicle can include an onboard vehicle computing system (e.g., located on or within the autonomous vehicle) that is configured to operate the autonomous vehicle. The vehicle computing system can obtain sensor data from sensor(s) onboard the vehicle (e.g., cameras, LIDAR, RADAR, GPS, etc.), access map data associated with an environment external to the autonomous vehicle and generate an appropriate motion plan through the vehicle's surrounding environment based on the sensor data and map data. To more accurately and efficiently generate a motion plan through the autonomous vehicle's surrounding environment, an autonomy computing system of an autonomous vehicle can include a machine-learned motion planning system that includes a unified cost function for behavioral and trajectory planning stages. The unified cost function can be jointly optimized for behavioral and trajectory planning using a combined loss function to train both stages with a common objective of generating optimal target trajectories.

A machine-learned motion planning system can include a behavioral planning stage and a trajectory planning stage. The behavioral planning stage can be configured to generate behavioral planning data that provides high-level decisions given the output(s) of previous systems of an autonomy vehicle computing system, such as the outputs of a perception system and/or a prediction system. By way of example, these high-level decisions may include lane change decisions, turning decisions, yielding decisions (e.g., at an intersection), etc. In some examples, the behavioral planning stage may generate a coarse trajectory that the autonomous vehicle can follow. The trajectory planning stage can be configured to obtain the decision provided by the behavioral planning stage and a coarse trajectory, and generate an optimized trajectory over a duration of a planning horizon (e.g., 5 s to 10 s into the future). Traditional motion planners utilize behavioral planners and trajectory planners that are configured for their individual purposes, without regard to the objective of the other planner or an overall objective of the motion planner as a whole. In accordance with example embodiments of the present disclosure, however, a machine-learned motion planning system includes behavioral and trajectory planning stages that are configured with a unified cost function to facilitate a shared or otherwise common objective between the two stages. Additionally, or alternatively, the behavioral and trajectory planning stages can be trained using a combined loss function to facilitate the generation of behaviors and trajectories with the common objective.

In accordance with some example aspects, the machine-learned motion planning system can obtain situational data that is generated by one or more upstream systems of an autonomy computing system for an autonomous vehicle. For example, the situational data may be provided by or otherwise derived from the outputs of a perception system and prediction system of a pipeline of the machine-learned system. Perception data and prediction data can be associated with one or multiple objects in a geographic area, including the autonomous vehicle. The perception system of a vehicle computing system may include one or more first machine-learned models associated with detecting objects external to an autonomous vehicle. By way of example, the one or more first machine-learned models may include object detection models included as part of a segmentation or detection component of the perception system, object tracking models included as part of a tracking component of the perception system, and/or classification models included as part of a classification component of the perception system. Perception data may be generated by the perception system and may include object detection data, object state data (e.g., data relating to an object's position, velocity, acceleration, heading, or other information relative to an object's current state), object classification data, object tracking data, etc. The prediction system of a vehicle computing system may include one or more machine-learned models associated with predicting a future state of an object. By way of example, a prediction system may determine a predicted trajectory of an object, a predicted position of an object, a predicted velocity of an object, a predicted acceleration of an object, a predicted heading of an object, or other information pertaining to a predicted state of an object. The motion planning system may utilize perception data and/or prediction data to generate data indicative of a target trajectory.

The situational data can include perception data, prediction data, and/or additional data in example embodiments. For example, the situational data can include a desired route for the autonomous vehicle, state data indicative of a state of the autonomous vehicle, state data indicative of the environment external to the autonomous vehicle (e.g., state data of detected objects), map data, and/or prediction data (e.g., future trajectories of detected objects).

The machine-learned motion planning system can obtain the situational data as an input and generate one or more outputs including behavioral planning data indicative of a high-level decision or behavior and trajectory planning data indicative of a trajectory that can be executed by the autonomous vehicle for a planning horizon. The high-level behavior and trajectory can be generated for behavioral planning and local trajectory planning using a shared cost function that can be learned end-to-end. The high-level behavior generated by the behavioral planning stage can include a driving-path that the autonomous vehicle should ideally converge to and follow. For instance, a driving-path can be obtained by considering maneuvers such as keep-lane, left-lane-change, and right-lane-change. Low-level realizations of high-level behaviors can be generated by generating a set of trajectories relative to the paths. A dynamical model can be applied to represent the autonomous vehicle state at a particular time using a vector for example. A trajectory can then be defined as a sequence of vehicle states at discrete timestamps ahead. The machine-learned motion planning system can be configured with an objective to determine a behavior and a trajectory that is safe, comfortable, and progresses along the route. The behavior and trajectory can be determined by minimizing the shared cost function that describes the desired output of both the behavior and trajectory portions of the machine-learned motion planning system.

According to some aspects, the machine-learned motion planning system includes two stages of optimization, including the behavioral planning stage and the trajectory planning stage. In the behavioral planning stage, a course level parameterization for trajectory generation can be adopted. The resulting trajectory can be found by selecting the trajectory with the lowest cost. The behavioral planning stage may include a trajectory sampler that obtains or generates a set of possible trajectories based on the situational data received from the upstream portions of the autonomy computing system. The behavioral planning stage may also include a trajectory selector that can utilize the unified cost function to select a trajectory having the lowest cost.

In some examples, the behavioral planning stage can utilize a bicycle or other dynamical model to represent the autonomous vehicle state at a particular time. The longitudinal state of the autonomous vehicle can be parameterized by time, while the lateral state of the autonomous vehicle can be parameterized by the longitudinal position. A set of longitudinal trajectories can be generated by computing a set of conditions for positions of the autonomous vehicle at particular times of the planning horizon. Given a set of longitudinal trajectories, a set of lateral trajectories can be parameterized in terms of a longitudinal distance. The set of lateral trajectories can be generated by computing a set of conditions for lateral offsets at particular positions of the autonomous vehicle. A dynamics cost can be computed in the behavioral planning stage by transforming each pair of sampled longitudinal and lateral trajectories to a dynamical model trajectory. The optimal trajectory for a given scenario can then be found by evaluating the unified cost function for all behaviors and trajectories and choosing the trajectory that achieves the minimum cost.

The optimal behavioral decision and course level trajectory can be passed from the behavioral planning stage to the trajectory planning stage. In the trajectory planning stage, a fine level parameterization can be applied where a trajectory is modeled as a function of vehicle control variables. The trajectory can be initialized with the output of the behavioral planning stage and optimized through a continuous optimization solver. The trajectory planning stage can include a trajectory fitter that can be used to compute control parameters for the autonomous vehicle. The coarse trajectory from the behavioral planning stage can be parameterized using control variables. A dynamical model can be used to model the trajectory as a function of the controls. Trajectory fitting can be applied to minimize a defined objective with respect to the control variables. In this manner, the optimization process can be started with a physically feasible trajectory. The trajectory planning stage can include a trajectory cost optimizer that achieves a local minimum of the overall cost function given a fitted control sequence as an initialization. Various solvers can be utilized to obtain a solution to an optimization problem defined in terms of the overall cost function.

The behavioral planning stage and the trajectory planning stage of the machine-learned motion planning system can utilize a unified cost function that can be trained end to end to select an optimal behavior and trajectory pair given sets of candidate behaviors and trajectories. In example embodiments, the unified cost function can include a plurality of sub-costs that focus on different aspects of the trajectories and at least one weight vector that captures the importance of each sub-cost.

By way of example, the sub-costs can include one or more obstacle sub-costs that represent that a safe trajectory for the autonomous vehicle should not only be collision free, but also satisfy a safety-distance to surrounding obstacles, including both static and dynamic objects such as vehicles, pedestrians, cyclists, unknown objects, etc. An overlap cost can capture the spatiotemporal overlap associated with objects and obstacle costs can represent violations of a safety distance associated with objects, for example. A driving path and lane boundary cost can be defined to represent that the autonomous vehicle is expected to adhere to the structure of a road. In other words, the autonomous vehicle should not go out of the lane boundary and should remain close to the center of the lane. Sub-costs can be introduced to measure such violations. One or more headway costs can be defined to represent that an autonomous vehicle driving behind a leading vehicle in either a lane-following or a lane-change behavior should keep a safe longitudinal distance from the leading vehicle. A headway cost, for example, can be computed as a violation of a safety distance. One or more yield costs can be defined to represent that the autonomous vehicle should maintain a safe distance from pedestrians or other sensitive objects. By way of example, a stopping point can be imposed at a safe longitudinal distance. A yield cost can be defined that penalizes violations of the safe longitudinal distance. One or more route costs can be defined that are associated with one or more routes represented as a sequence of lanes, from which it can be specified that all lanes are on the route or are connected to the route by permitted lane changes. A behavior can be defined that is desirable if the goal lane is closer to the route than a current lane. A number of lane changes that is required to converge to the route can be penalized. Additionally, or alternatively, violations of the distance threshold to the end of the lane can be penalized to force lane changes from dead-end lanes to lanes that the autonomous vehicle can continue on a route. A "cost to go" sub-cost can be introduced that represents a value of a final state of the autonomous vehicle and a trajectory. For example, a "cost to go" sub-cost can cause the motion planning system to avoid choosing actions that are sub optimal beyond a planning horizon or that may take the autonomous vehicle into an inevitable unsafe situation. Other sub-costs such as speed limit sub-costs, travel distance sub-costs, and dynamics sub-costs can be used. A speed limit sub-cost can be used to penalize trajectories that go above an eligible speed, for example. A travel distance sub-cost can be utilized in order to favor trajectories that advance in a route. A dynamics cost can be defined in order to penalize aggressive motions and to promote comfortable driving.

In accordance with example embodiments, a machine-learned motion planning system including a behavioral planning stage and a trajectory planning stage can utilize a shared cost function that is learned end to end. In order to train the machine-learned motion planning system end to end to learn the shared cost function, a combined loss function can be used for training the individual planning stages. The combined loss function can include multiple loss components such as a combination of a max-margin loss component and an imitation learning loss component. The max-margin loss component can operate on the output of the behavioral planning stage to penalize trajectories that have a small cost and/or are different from a human driven trajectory represented by training data provided as an input to the machine-learned motion planning system during training. The imitation learning loss component to be utilized to measure a distance between positions of the human trajectory and optimal trajectory generated by the trajectory planning stage. By utilizing a combined loss function having a behavioral planning component and a trajectory planning component, the machine-learned system can be trained end to end so that the behavioral planning stage passes an optimal behavioral decision to the trajectory planning stage, which can generate an optimal trajectory. The combined loss function can be utilized to learn the shared cost function that is utilized for both behavioral planning and local trajectory planning.

Embodiments in accordance with the disclosed technology provide a number of technical effects and benefits, particularly in the areas of computing technology, autonomous vehicles, and the integration of computing technology with autonomous vehicles. In particular, example implementations of the disclosed technology provide improved techniques for generating motion plans such as target trajectories for autonomous vehicles. For example, by utilizing one or more implementations of the disclosed technology, a vehicle computing system can more accurately and efficiently generate motion plans for an autonomous vehicle and thereby enable the autonomous vehicle to drive autonomously in complex scenarios that may include traffic light handling, yielding, and interactions with multiple actors such as pedestrians and other vehicles.

By training behavioral planning and trajectory planning stages of a machine-learned motion planning system with a common objective, an adaptable system is provided that can accommodate modifications to either the behavioral planning system or the trajectory planning stage. A learnable behavioral planning stage and trajectory planning stage as described can provide a motion planning system that addresses both behavioral planning and trajectory planning jointly. The learnable system can include an interpretable cost function provided on top of a perception system, a prediction system, and/or a vehicle dynamics system. A combined loss function can be used so that the motion planning system learns a shared cost function employed by both the behavioral planning and trajectory planning stages. In this manner, the behavioral planning stage can generate high-level behavioral decisions and produce a coarse trajectory, while the trajectory planning stage generates a smooth, feasible trajectory for the duration of the planning horizon.

The stages can be trained jointly using a common loss function to promote similarity between the coarse level trajectory generated by the behavioral planning stage and the final trajectory generated by the trajectory planning stage. By employing an interpretable and learnable cost function with a joint learning approach (e.g., a common loss function), a framework is provided where both behavioral planning and local trajectory planning can be learned end to end. Interpretable costs can be joint imposed on both stages to impose a common objective on the system. Moreover, the learned system can accomplish the features while eliminating time-consuming, error-prone, and iterative hand-tuning of the grains of planner costs.

Accordingly, an autonomous vehicle according to an example aspect of the present disclosure can include a machine-learned motion planning system including one or more machine-learned models that are configured to generate target trajectories for the autonomous vehicle. The machine-learned motion planning system can include a behavioral planning stage configured to receive situational data based at least in part on the output(s) of a set of sensors of the autonomous vehicle. The situational data may include inference data generated by one or more upstream systems of the autonomy computing system. The motion planning system can generate behavioral planning data (e.g., a behavioral planning decision such as turn-left) based at least in part on the situational data and a unified cost function. The machine-learned motion planning system can include a trajectory planning stage configured to receive the behavioral planning data from the behavioral planning stage and to generate target trajectory data for the autonomous vehicle based at least in part on the behavioral planning data and the unified cost function. The motion planning system can generate one or more motion plans based on the target trajectory.

A computer-implemented method of motion planning for an autonomous vehicle according to an example aspect of the present disclosure can include obtaining, by a computing system comprising one or more computing devices, situational data associated with an environment detected by one or more sensors of the autonomous vehicle. The method can include generating, by the computing system using a behavioral planning stage and a unified cost function of a machine-learned motion planning system, data indicative of at least one behavioral decision for the autonomous vehicle based at least in part on the situational data. The method can include generating, by the computing system using a trajectory planning stage and the unified cost function of the machine-learned motion planning system, target trajectory data indicative of a target trajectory for the autonomous vehicle based at least in part on the data indicative of at least one behavioral decision for the autonomous vehicle. The method can include generating, by the computing system, one or more motion plans based on the target trajectory.

A computing system according to an example aspect of the present disclosure can include a machine-learned motion planning system configured to obtain situational data based at least in part on one or more outputs of a set of sensors of an autonomous vehicle. The motion planning system can generate a behavioral decision based at least in part on the situational data using a behavioral planning stage. The motion planning system can output a target trajectory for the autonomous vehicle using a trajectory planning stage. The computing system can include one or more processors and one or more non-transitory computer-readable media that store instructions, that when executed by the one or more processors, cause the one or more processors to perform operations for training the motion planning system. The operations can include inputting, to the machine-learned motion planning system, training data including annotated sensor data indicating ground truth vehicle trajectories, determining a loss associated with one or more target trajectories generated by the machine-learned motion planning system relative to the annotated sensor data based at least in part on a combined loss function including a first loss component associated with the behavioral planning stage and a second loss component associated with the trajectory planning stage, and backpropagating the loss associated with the one or more target trajectories to the machine-learned motion planning system to jointly train the behavioral planning stage and the trajectory planning stage.

With reference now to the figures, example embodiments of the present disclosure will be discussed in further detail.

FIG. 1 depicts an example system overview including an autonomous vehicle according to example embodiments of the present disclosure. FIG. 1 illustrates an example vehicle computing system 110 which can be associated with a vehicle 102 in accordance with example embodiments. The vehicle computing system 110 can be located onboard (e.g., included on and/or within) the vehicle 102.

The vehicle 102 incorporating the vehicle computing system 110 can be various types of vehicles. In some implementations, the vehicle 102 can be an autonomous vehicle. For instance, the vehicle 102 can be a ground-based autonomous vehicle such as an autonomous car, autonomous truck, autonomous bus, etc. The vehicle 102 can be an air-based autonomous vehicle (e.g., airplane, helicopter, bike, scooter, or other aircraft) or other types of vehicles (e.g., watercraft, etc.). The vehicle 102 can drive, navigate, operate, etc. with minimal and/or no interaction from a human operator 106 (e.g., driver). An operator 106 (also referred to as a vehicle operator) can be included in the vehicle 102 and/or remote from the vehicle 102. Moreover, in some implementations, the vehicle 102 can be a non-autonomous vehicle. The operator 106 can be associated with the vehicle 102 to take manual control of the vehicle, if necessary. For instance, in a testing scenario, a vehicle 102 can be periodically tested with controlled faults that can be injected into an autonomous vehicle's autonomy system 130. This can help the vehicle's response to certain scenarios. A vehicle operator 106 can be located within the vehicle 102 and/or remote from the vehicle 102 to take control of the vehicle 102 (e.g., in the event the fault results in the vehicle exiting from a fully autonomous mode in the testing environment).

The vehicle 102 can be configured to operate in a plurality of operating modes. For example, the vehicle 102 can be configured to operate in a fully autonomous (e.g., self-driving) operating mode in which the vehicle 102 is controllable without user input (e.g., can drive and navigate with no input from a vehicle operator present in the vehicle 102 and/or remote from the vehicle 102). The vehicle 102 can operate in a semi-autonomous operating mode in which the vehicle 102 can operate with some input from a vehicle operator present in the vehicle 102 (and/or a human operator that is remote from the vehicle 102). The vehicle 102 can enter into a manual operating mode in which the vehicle 102 is fully controllable by a vehicle operator 106 (e.g., human driver, pilot, etc.) and can be prohibited and/or disabled (e.g., temporary, permanently, etc.) from performing autonomous navigation (e.g., autonomous driving). In some implementations, the vehicle 102 can implement vehicle operating assistance technology (e.g., collision mitigation system, power assist steering, etc.) while in the manual operating mode to help assist the vehicle operator 106 of the vehicle 102. For example, a collision mitigation system can utilize information concerning vehicle trajectories within the vehicle's surrounding environment to help an operator avoid collisions even when in manual mode.

The operating modes of the vehicle 102 can be stored in a memory onboard the vehicle 102. For example, the operating modes can be defined by an operating mode data structure (e.g., rule, list, table, etc.) that indicates one or more operating parameters for the vehicle 102, while in the particular operating mode. For example, an operating mode data structure can indicate that the vehicle 102 is to autonomously plan its motion when in the fully autonomous operating mode. The vehicle computing system 110 can access the memory when implementing an operating mode.

The operating mode of the vehicle 102 can be adjusted in a variety of manners. For example, the operating mode of the vehicle 102 can be selected remotely, off-board the vehicle 102. For example, a remote computing system (e.g., of a vehicle provider and/or service entity associated with the vehicle 102) can communicate data to the vehicle 102 instructing the vehicle 102 to enter into, exit from, maintain, etc. an operating mode. For example, in some implementations, the remote computing system can be an operations computing system 180, as disclosed herein. By way of example, such data communicated to a vehicle 102 by the operations computing system 180 can instruct the vehicle 102 to enter into the fully autonomous operating mode. In some implementations, the operating mode of the vehicle 102 can be set onboard and/or near the vehicle 102. For example, the vehicle computing system 110 can automatically determine when and where the vehicle 102 is to enter, change, maintain, etc. a particular operating mode (e.g., without user input). Additionally, or alternatively, the operating mode of the vehicle 102 can be manually selected via one or more interfaces located onboard the vehicle 102 (e.g., key switch, button, etc.) and/or associated with a computing device proximate to the vehicle 102 (e.g., a tablet operated by authorized personnel located near the vehicle 102). In some implementations, the operating mode of the vehicle 102 can be adjusted by manipulating a series of interfaces in a particular order to cause the vehicle 102 to enter into a particular operating mode.

The vehicle computing system 110 can include one or more computing devices located onboard the vehicle 102. For example, the computing device(s) can be located on and/or within the vehicle 102. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 102 (e.g., its computing system, one or more processors, etc.) to perform operations and functions, such as those described herein for identifying travel way features.

The vehicle 102 can include a communications system 112 configured to allow the vehicle computing system 110 (and its computing device(s)) to communicate with other computing devices. The vehicle computing system 110 can use the communications system 112 to communicate with one or more computing device(s) that are remote from the vehicle 102 over one or more networks (e.g., via one or more wireless signal connections). For example, the communications system 112 can allow the vehicle computing system 110 to communicate with an operations computing system 180. By way of example, the operations computing system 180 can include one or more remote servers communicatively linked to the vehicle computing system 110. In some implementations, the communications system 112 can allow communication among one or more of the system(s) onboard the vehicle 102. The communications system 112 can include any suitable components for interfacing with one or more network(s), including, for example, transmitters, receivers, ports, controllers, antennas, and/or other suitable components that can help facilitate communication.

As shown in FIG. 1, the vehicle 102 can include one or more vehicle sensor(s) 116, an autonomy computing system 130, one or more vehicle control systems 120, one or more positioning systems 114, and other systems, as described herein. One or more of these systems can be configured to communicate with one another via a communication channel. The communication channel can include one or more data buses (e.g., controller area network (CAN)), onboard diagnostics connector (e.g., OBD-II), and/or a combination of wired and/or wireless communication links. The onboard systems can send and/or receive data, messages, signals, etc. amongst one another via the communication channel.

The vehicle sensor(s) 116 can be configured to acquire sensor data 118. This can include sensor data associated with the surrounding environment of the vehicle 102. For instance, the sensor data 118 can include two-dimensional data depicting the surrounding environment of the vehicle 102. In addition, or alternatively, the sensor data 118 can include three-dimensional data associated with the surrounding environment of the vehicle 102. For example, the sensor(s) 116 can be configured to acquire image(s) and/or other two- or three-dimensional data within a field of view of one or more of the vehicle sensor(s) 116. The vehicle sensor(s) 116 can include a Light Detection and Ranging (LIDAR) system, a Radio Detection and Ranging (RADAR) system, one or more cameras (e.g., visible spectrum cameras, infrared cameras, etc.), motion sensors, and/or other types of two-dimensional and/or three-dimensional capturing devices. The sensor data 118 can include image data, radar data, LIDAR data, and/or other data acquired by the vehicle sensor(s) 116. For example, the vehicle sensor(s) 116 can include a front-facing RGB camera mounted on top of the vehicle 102 and the sensor data 118 can include an RGB image depicting the surrounding environment of the vehicle 102. In addition, or alternatively, the vehicle sensor(s) 116 can include one or more LIDAR sensor(s) and the sensor data 118 can include one or more sparse sets of LIDAR measurements. Moreover, the vehicle 102 can also include other sensors configured to acquire data associated with the vehicle 102. For example, the vehicle 102 can include inertial measurement unit(s), wheel odometry devices, and/or other sensors. In some implementations, the sensor data 118 and/or map data 132 can be processed to select one or more target trajectories for traversing within the surrounding environment of the vehicle 102.

In addition to the sensor data 118, the autonomy computing system 130 can retrieve or otherwise obtain map data 132. The map data 132 can provide static world representations about the surrounding environment of the vehicle 102. For example, in some implementations, a vehicle 102 can exploit prior knowledge about the static world by building very detailed maps (HD maps) that represent not only the roads, buildings, bridges, and landmarks, but also traffic lanes, signs, and lights to centimeter accurate three-dimensional representations. More particularly, map data 132 can include information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); the location of obstructions (e.g., roadwork, accidents, etc.); data indicative of events (e.g., scheduled concerts, parades, etc.); and/or any other data that provides information that assists the vehicle 102 in comprehending and perceiving its surrounding environment and its relationship thereto.

The vehicle 102 can include a positioning system 114. The positioning system 114 can determine a current position of the vehicle 102. The positioning system 114 can be any device or circuitry for analyzing the position of the vehicle 102. For example, the positioning system 114 can determine a position by using one or more of inertial sensors (e.g., inertial measurement unit(s), etc.), a satellite positioning system, based on IP address, by using triangulation and/or proximity to network access points or other network components (e.g., cellular towers, WiFi access points, etc.) and/or other suitable techniques. The position of the vehicle 102 can be used by various systems of the vehicle computing system 110 and/or provided to a remote computing system. For example, the map data 132 can provide the vehicle 102 relative positions of the elements of a surrounding environment of the vehicle 102. The vehicle 102 can identify its position within the surrounding environment (e.g., across six axes, etc.) based at least in part on the map data 132. For example, the vehicle computing system 110 can process the sensor data 118 (e.g., LIDAR data, camera data, etc.) to match it to a map of the surrounding environment to get an understanding of the vehicle's position within that environment.

The autonomy computing system 130 can include a perception system 140, a prediction system 150, a motion planning system 160, and/or other systems that cooperate to perceive the surrounding environment of the vehicle 102 and determine a motion plan for controlling the motion of the vehicle 102 accordingly.

For example, the autonomy computing system 130 can obtain the sensor data 118 from the vehicle sensor(s) 116, process the sensor data 118 (and/or other data) to perceive its surrounding environment, predict the motion of objects within the surrounding environment, and generate an appropriate motion plan through such surrounding environment. The autonomy computing system 130 can communicate with the one or more vehicle control systems 120 to operate the vehicle 102 according to the motion plan.

The vehicle computing system 110 (e.g., the autonomy computing system 130) can identify one or more objects that are proximate to the vehicle 102 based at least in part on the sensor data 118 and/or the map data 132. For example, the vehicle computing system 110 (e.g., the perception system 140) can process the sensor data 118, the map data 132, etc. to obtain perception data 142. The vehicle computing system 110 can generate perception data 142 that is indicative of one or more states (e.g., current and/or past state(s)) of a plurality of objects that are within a surrounding environment of the vehicle 102. For example, the perception data 142 for each object can describe (e.g., for a given time, time period) an estimate of the object's: current and/or past location (also referred to as position); current and/or past speed/velocity; current and/or past acceleration; current and/or past heading; current and/or past orientation; size/footprint (e.g., as represented by a bounding shape); class (e.g., pedestrian class vs. vehicle class vs. bicycle class); the uncertainties associated therewith, and/or other state information. The perception system 140 can provide the perception data 142 to the prediction system 150, the motion planning system 160, and/or other system(s).

The prediction system 150 can be configured to predict a motion of the object(s) within the surrounding environment of the vehicle 102. For instance, the prediction system 150 can generate prediction data 152 associated with such object(s). The prediction data 152 can be indicative of one or more predicted future locations of each respective object. For example, the prediction system 150 can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction data 152 can be indicative of the speed and/or acceleration at which the respective object is predicted to travel along its associated predicted motion trajectory. The prediction system 150 can output the prediction data 152 (e.g., indicative of one or more of the predicted motion trajectories) to the motion planning system 160.

The vehicle computing system 110 (e.g., the motion planning system 160) can determine a motion plan 162 for the vehicle 102 based at least in part on the perception data 142, the prediction data 152, and/or other data.

A motion plan 162 can include vehicle actions (e.g., planned vehicle trajectories, speed(s), acceleration(s), other actions, etc.) with respect to one or more of the objects within the surrounding environment of the vehicle 102 as well as the objects' predicted movements. For instance, the motion planning system 160 can implement an optimization algorithm, model, etc. that considers cost data associated with a vehicle action as well as other objective functions (e.g., cost functions based on speed limits, traffic lights, etc.), if any, to determine optimized variables that make up the motion plan 162. The motion planning system 160 can determine that the vehicle 102 can perform a certain action (e.g., pass an object, etc.) without increasing the potential risk to the vehicle 102 and/or violating any traffic laws (e.g., speed limits, lane boundaries, signage, etc.). For instance, the motion planning system 160 can evaluate one or more of the predicted motion trajectories of one or more objects during its cost data analysis as it determines an optimized vehicle trajectory through the surrounding environment. The motion planning system 160 can generate cost data associated with such trajectories. In some implementations, one or more of the predicted motion trajectories may not ultimately change the motion of the vehicle 102 (e.g., due to an overriding factor). In some implementations, the motion plan 162 may define the vehicle's motion such that the vehicle 102 avoids the object(s), reduces speed to give more leeway to one or more of the object(s), proceeds cautiously, performs a stopping action, etc.

The motion planning system 160 can be configured to continuously update the vehicle's motion plan 162 and a corresponding planned vehicle motion trajectory. For example, in some implementations, the motion planning system 160 can generate new motion plan(s) for the vehicle 102 (e.g., multiple times per second). Each new motion plan can describe a motion of the vehicle 102 over the next planning period (e.g., next several seconds). Moreover, a new motion plan may include a new planned vehicle motion trajectory. Thus, in some implementations, the motion planning system 160 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 102.

The vehicle computing system 110 can cause the vehicle 102 to initiate a motion control in accordance with at least a portion of the motion plan 162. A motion control can be an operation, action, etc. that is associated with controlling the motion of the vehicle. For instance, the motion plan 162 can be provided to the vehicle control system(s) 120 of the vehicle 102. The vehicle control system(s) 120 can be associated with a vehicle controller (e.g., including a vehicle interface) that is configured to implement the motion plan 162. The vehicle controller can, for example, translate the motion plan into instructions for the appropriate vehicle control component (e.g., acceleration control, brake control, steering control, etc.). By way of example, the vehicle controller can translate a determined motion plan 162 into instructions to adjust the steering of the vehicle 102 "X" degrees, apply a certain magnitude of braking force, etc. The vehicle controller (e.g., the vehicle interface) can help facilitate the responsible vehicle control (e.g., braking control system, steering control system, acceleration control system, etc.) to execute the instructions and implement the motion plan 162 (e.g., by sending control signal(s), making the translated plan available, etc.). This can allow the vehicle 102 to autonomously travel within the vehicle's surrounding environment.

Although many examples are described herein with respect to autonomous vehicles, the disclosed technology is not limited to autonomous vehicles. In fact, any object capable of collecting sensor data and map data can utilize the technology described herein for generating a target trajectory. For example, a non-autonomous vehicle may utilize aspects of the present disclosure to generate a target trajectory for an operator of the non-autonomous vehicle, notify the vehicle operator of the target trajectory, and take precautionary measures based on the identified target trajectory. Likewise, a smart phone with one or more cameras, a robot, augmented reality system, and/or another type of system can utilize aspects of the present disclosure to generate target trajectories.

Figure 2:
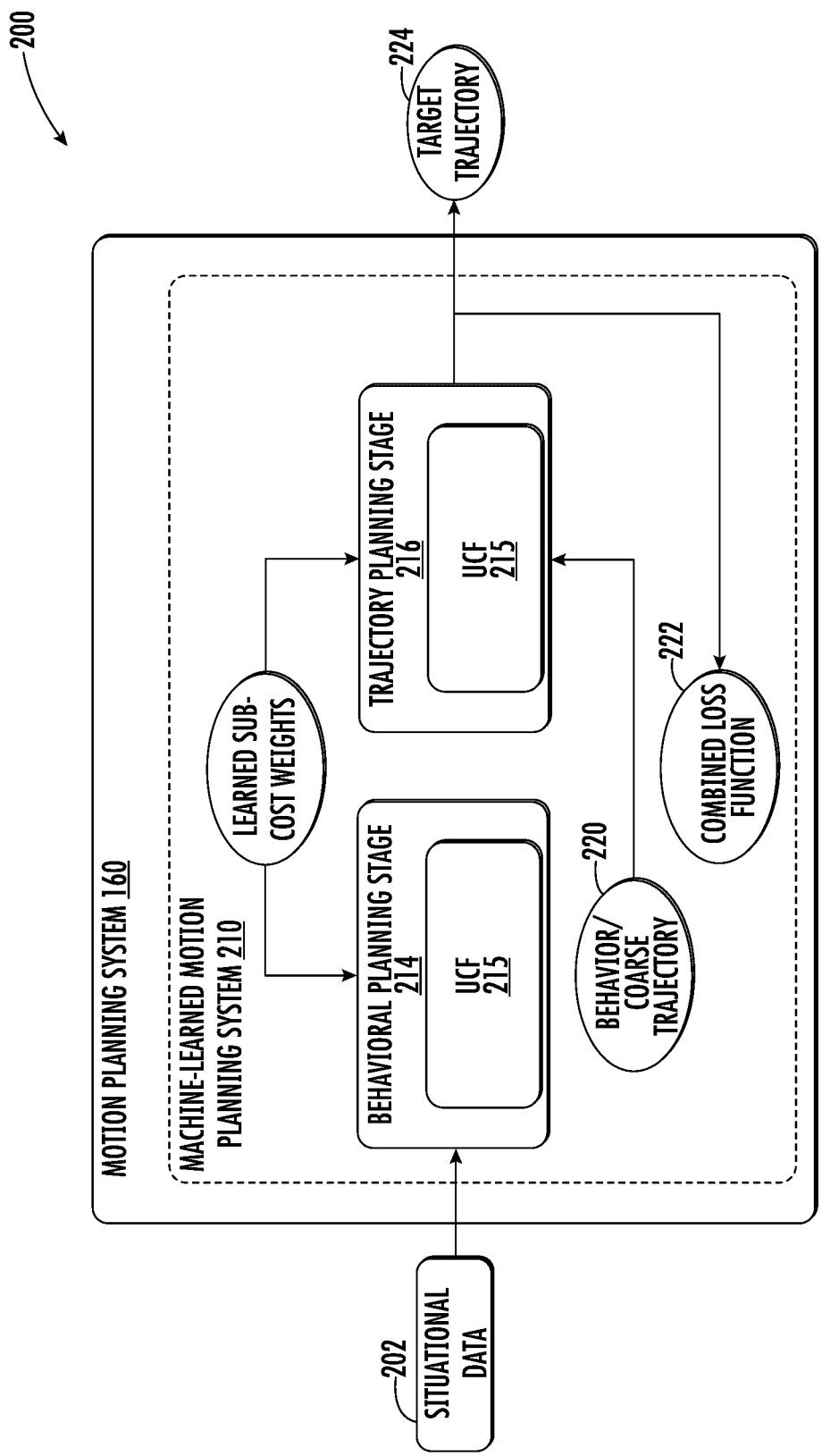
FIG. 2 depicts an example computing environment including a motion planning system of a vehicle computing system for an autonomous vehicle according to example embodiments of the present disclosure.

FIG. 2 depicts an example computing environment 200 including a motion planning system 160 of a vehicle computing system for an autonomous vehicle according to example embodiments of the present disclosure. Motion planning system 160 includes a machine-learned motion planning system 210 which can include a behavioral planning stage 214 and a trajectory planning stage 216. The behavioral planning stage receives situational data 202 from the output(s) of previous systems of the autonomy vehicle computing system, such as the outputs of a perception system and/or a prediction system. The situational data can include perception data, prediction data, and/or additional data in example embodiments. For example, the situational data can include a desired route for the autonomous vehicle, state data indicative of a state of the autonomous vehicle, state data indicative of the environment external to the autonomous vehicle (e.g., state data of detected objects), map data, and/or prediction data (e.g., future trajectories of detected objects).

The behavioral planning stage 214 can be configured to generate behavioral planning data 220 that provides high-level decisions such as a behavior or a coarse trajectory for the vehicle. By way of example, these high-level decisions may include lane change decisions, turning decisions, yielding decisions (e.g., at an intersection), etc. In some examples, the behavioral planning stage may generate a coarse trajectory that the autonomous vehicle can follow. The trajectory planning stage 216 can be configured to obtain the behavior planning data 220 including a coarse trajectory provided by the behavioral planning stage, and generate an optimized target trajectory 224 over a duration of a planning horizon (e.g., 5 s to 10 s into the future). Machine-learned motion planning system 210 includes behavioral and trajectory planning stages that are configured with a unified cost function 215 to facilitate a shared or otherwise common objective between the two stages. Additionally, or alternatively, the behavioral and trajectory planning stages can be trained using a combined loss function 222 to facilitate the generation of behaviors and trajectories with the common objective.

Figure 3:
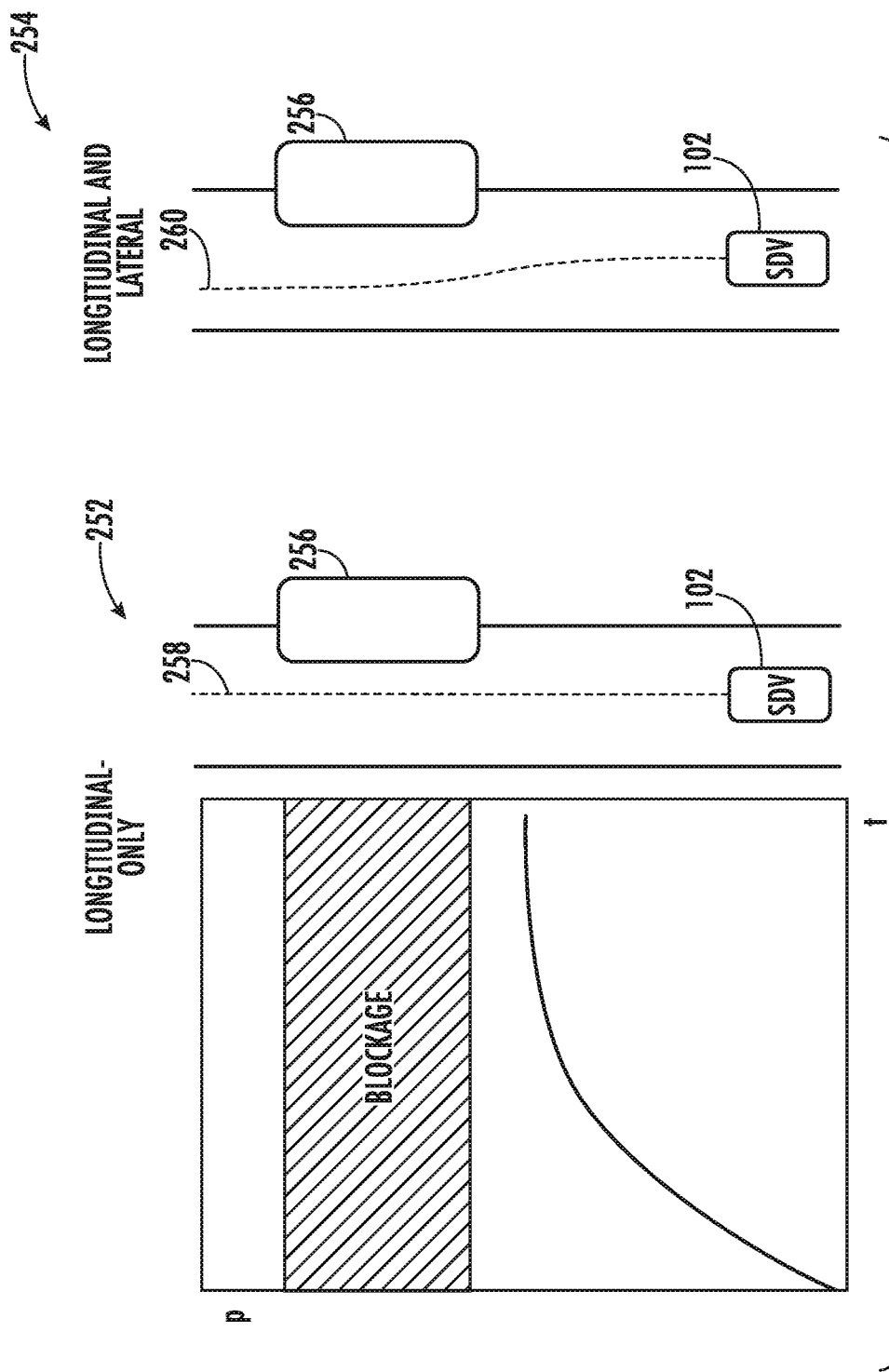
FIG. 3 depicts an example scenario associated with an autonomous vehicle and illustrates behavioral decision planning based on longitudinal and lateral components according to example embodiments of the present disclosure.

FIG. 3 depicts an example scenario associated with an autonomous vehicle and illustrates behavioral decision planning based on longitudinal and lateral components according to example embodiments of the present disclosure. An example of behavioral planning based on longitudinal components only is depicted at 252 and an example of behavioral planning based on longitudinal components and lateral components as illustrated at 254. An example of an autonomous vehicle 102 interaction with a truck 256 or other object positioned partially within the autonomous vehicle's lane is illustrated. If longitudinal components alone are utilized for behavioral planning, a trajectory illustrated at 258 may be generated whereby the autonomous vehicle does not move laterally. In such an example, the autonomous vehicle may remain behind the truck 256 in order to maintain a safe distance in a lateral direction. If lateral components are considered in addition to longitudinal components, a trajectory as illustrated at 260 may be generated whereby the autonomous vehicle moves laterally (sometimes referred to as a nudge) to pass the truck 256 in order to continue moving longitudinally.

Figure 4:
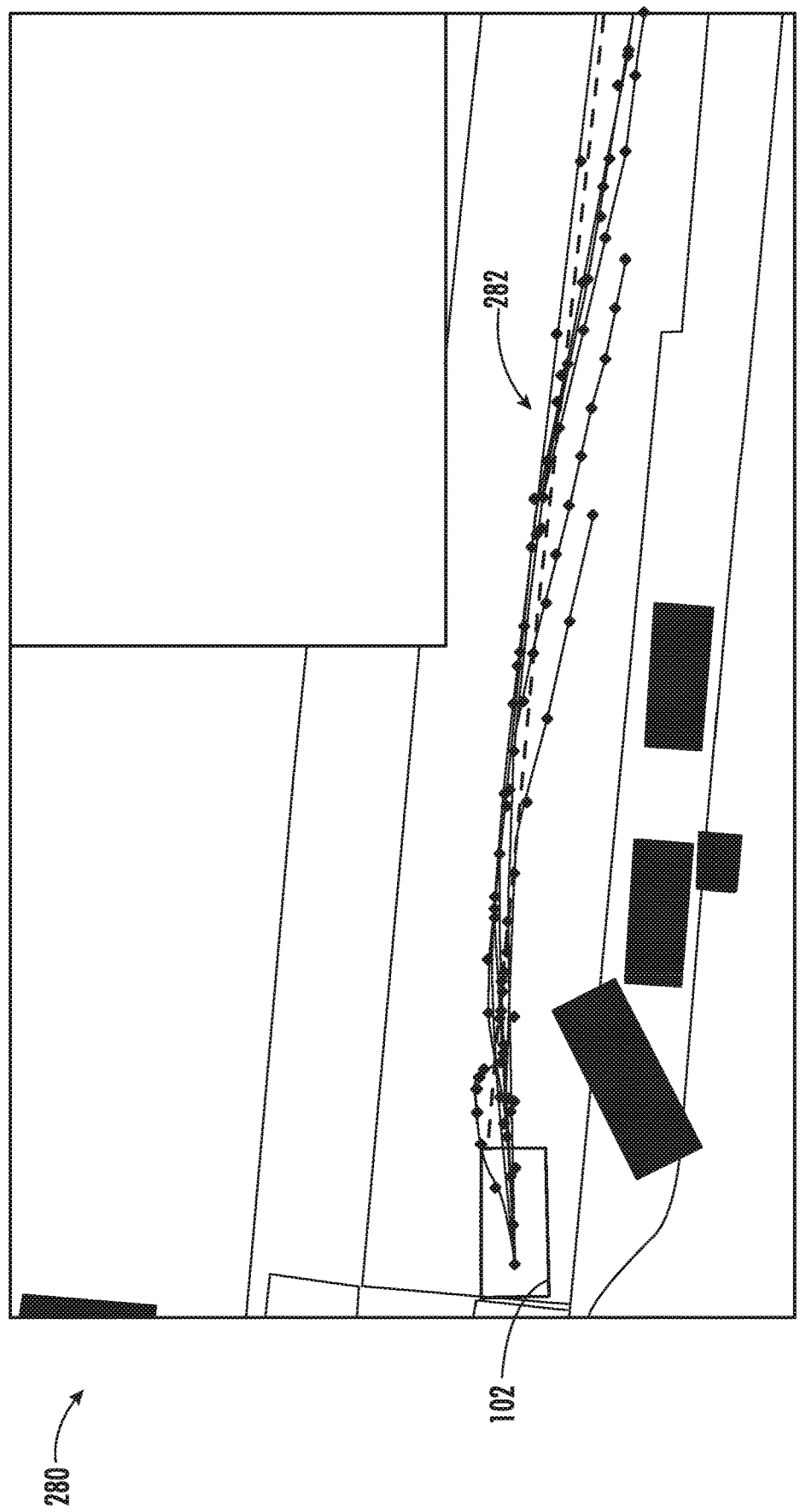
FIG. 4 depicts an example scenario associated with an autonomous vehicle and a set of example trajectories according to example embodiments of the present disclosure.

FIG. 4 depicts an example scenario 280 associated with an autonomous vehicle 102 and a set of example trajectories 282 according to example embodiments of the present disclosure. FIG. 4 illustrates a set of example trajectories that can be generated for a nudging behavior based on behavioral planning and trajectory planning stages that share a common objective.

Figure 5:
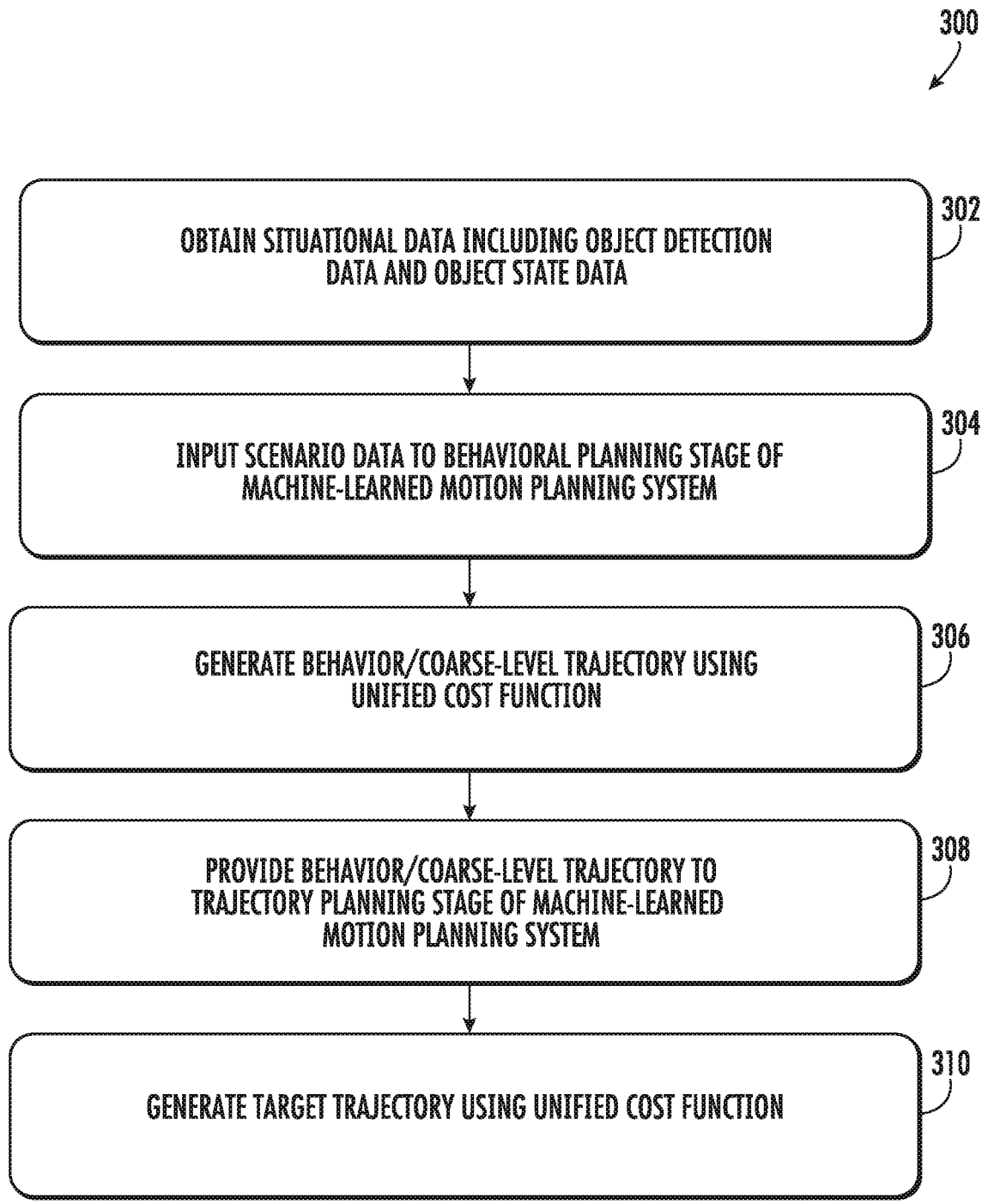
FIG. 5 depicts a flowchart illustrating an example method for generating behaviors and target trajectories using a behavioral planning stage and a trajectory planning stage that share a unified cost function according to example embodiments of the present disclosure.

FIG. 5 depicts a flowchart illustrating an example method 300 for generating behaviors and target trajectories using a behavioral planning stage and a trajectory planning stage that share a unified cost function according to example embodiments of the present disclosure. One or more portions of method 300 (and the other methods described herein such as method 450 of FIG. 9, method 600 of FIG. 11 and/or method 650 of FIG. 12) can be implemented by one or more computing devices such as, for example, one or more computing devices of vehicle computing system 110 of FIG. 1 or computing system 1000 of FIG. 14. One or more portions of method 300 can be implemented as an algorithm on the hardware components of the devices described herein (e.g., as in FIGS. 1 and 14) to, for example, generate a target trajectory for an autonomous vehicle. In example embodiments, method 300 may be performed by a motion planning system 160 implemented using one or more computing devices of a vehicle computing system (e.g., 200).

At 302, method 300 can include obtaining situational data including object detection data in object state data associated with an autonomous vehicle. The situational data can be generated by one or more upstream systems of an autonomy computing system for an autonomous vehicle. For example, the situational data may be provided by or otherwise derived from the outputs of a perception system and prediction system of a pipeline of the machine-learned system. Perception data and prediction data can be associated with one or multiple objects in a geographic area, including the autonomous vehicle. The perception system of a vehicle computing system may include one or more first machine-learned models associated with detecting objects external to an autonomous vehicle. By way of example, the one or more first machine-learned models may include object detection models included as part of a segmentation or detection component of the perception system, object tracking models included as part of a tracking component of the perception system, and/or classification models included as part of a classification component of the perception system. Perception data may be generated by the perception system and may include object detection data, object state data (e.g., data relating to an object's position, velocity, acceleration, heading, or other information relative to an object's current state), object classification data, object tracking data, etc. The prediction system of a vehicle computing system may include one or more machine-learned models associated with predicting a future state of an object. By way of example, a prediction system may determine a predicted trajectory of an object, a predicted position of an object, a predicted velocity of an object, a predicted acceleration of an object, a predicted heading of an object, or other information pertaining to a predicted state of an object. The motion planning system may utilize perception data and/or prediction data to generate data indicative of a target trajectory.

At 304, method 300 can include inputting the situational data into the behavioral planning stage of a machine learned motion planning system. At 306, method 300 can include generating behavior/course level trajectory information using a unified cost function. The behavioral planning data can be indicative of a high-level decision or behavior associated with the autonomous vehicle. The high-level behavior generated by the behavioral planning stage can include a driving-path that the autonomous vehicle should ideally converge to and follow. For instance, a driving-path can be obtained by considering maneuvers such as keep-lane, left-lane-change, and right-lane-change.

At 308, method 300 can include providing the behavior/course level trajectory information to the trajectory planning stage of the machine learned motion planning system. At 310, method 300 can include generating a target trajectory using the unified cost function. Data can be generated that is indicative of a trajectory that can be executed by the autonomous vehicle for a planning horizon. Low-level realizations of high-level behaviors can be generated by generating a set of trajectories relative to the paths. A dynamical model can be applied to represent the autonomous vehicle state at a particular time using a vector for example. A trajectory can then be defined as a sequence of vehicle states at discrete timestamps ahead. The machine-learned motion planning system can be configured with an objective to determine a behavior and a trajectory that is safe, comfortable, and progresses along the route. The behavior and trajectory can be determined by minimizing the shared cost function that describes the desired output of both the behavior and trajectory portions of the machine-learned motion planning system.

Figure 6:
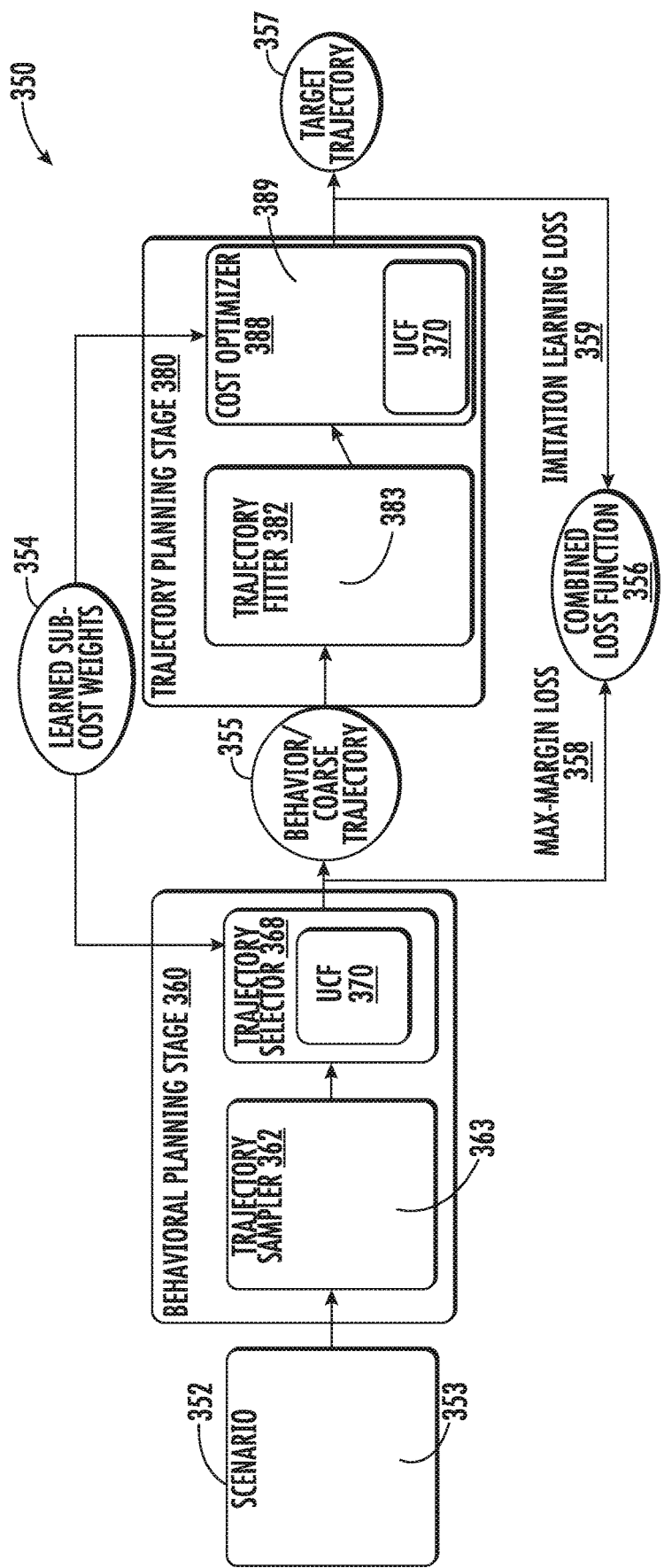
FIG. 6 depicts an example computing environment including a machine-learned motion planning system including a behavioral planning stage and a trajectory planning stage according to example embodiments of the present disclosure.

FIG. 6 depicts an example computing environment 350 including a machine-learned motion planning system including a behavioral planning stage 360 and a trajectory planning stage 380 according to example embodiments of the present disclosure. The behavioral planning stage 360 and the trajectory planning stage 380 provide two stages of optimization. In the behavioral planning stage 360, a course level parameterization for trajectory generation can be adopted. The resulting trajectory can be found by selecting the trajectory with the lowest cost. The behavioral planning stage may include a trajectory sampler 362 that obtains or generates a set of possible trajectories 363 based on the situational data 352 received from the upstream portions of the autonomy computing system. The situational data 352 may represent one or more scenarios 353 associated with the autonomous vehicle. The behavioral planning stage may also include a trajectory selector 368 that can utilize the unified cost function 370 to select a trajectory having the lowest cost.

Behavioral planning data 355 including the optimal behavioral decision and course level trajectory can be passed from the behavioral planning stage 360 to the trajectory planning stage 380. In the trajectory planning stage 380, a fine level parameterization can be applied where a trajectory is modeled as a function of vehicle control variables. The trajectory can be initialized with the output of the behavioral planning stage and optimized through a continuous optimization solver. The trajectory planning stage can include a trajectory fitter 382 that can be used to compute control parameters for the autonomous vehicle. The coarse trajectory from the behavioral planning stage can be parameterized using control variables. A dynamical model can be used to model the trajectory as a function of the controls. Trajectory fitting can be applied by trajectory fitter 382 to minimize a defined objective with respect to the control variables. In this manner, the optimization process can be started with a physically feasible trajectory. The trajectory planning stage can include a trajectory cost optimizer 388 that achieves a local minimum of the overall cost function 370 given a fitted control sequence as an initialization. Various solvers can be utilized to obtain a solution to an optimization problem 389 defined in terms of the overall cost function 370.

The behavioral planning stage 360 and the trajectory planning stage 380 of the machine-learned motion planning system can utilize a unified cost function 370 that can be trained end to end to select an optimal behavior and trajectory pair given sets of candidate behaviors and trajectories. In example embodiments, the unified cost function can include a plurality of sub-costs 354 that focus on different aspects of the trajectories and at least one weight vector that captures the importance of each sub-cost.

The behavioral planning stage 360 and a trajectory planning stage 380 can utilize a shared or unified cost function 370 that is learned end to end. In order to train the machine-learned motion planning system end to end to learn the shared cost function, a combined loss function 356 can be used for training the individual planning stages. The combined loss function 356 can include multiple loss components such as a combination of a max-margin loss component 358 and an imitation learning loss component 359. The max-margin loss component 358 can operate on the output of the behavioral planning stage 360 to penalize trajectories that have a small cost and/or are different from a human driven trajectory represented by training data provided as an input to the machine-learned motion planning system during training. The imitation learning loss component 359 can be utilized to measure a distance between positions of the human trajectory and optimal trajectory generated by the trajectory planning stage 380. By utilizing a combined loss function 356 having a behavioral planning component and a trajectory planning component, the machine-learned system can be trained end to end so that the behavioral planning stage 360 passes an optimal behavioral decision to the trajectory planning stage 380, which can generate an optimal target trajectory 357. The combined loss function 356 can be utilized to learn the unified cost function 370 for both behavioral planning and local trajectory planning.

Figure 7:
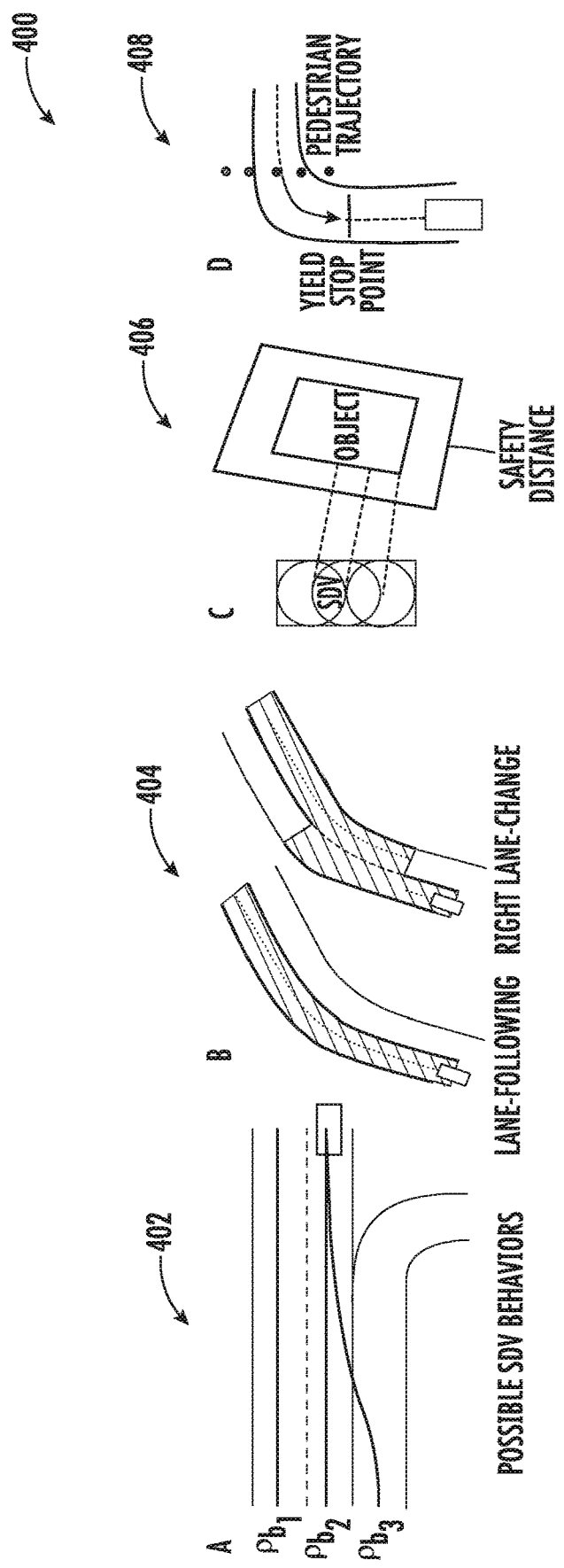
FIG. 7 depicts example aspects of autonomous vehicle behaviors, costs associated with lane boundaries and a driving path, autonomous vehicle geometry for spatiotemporal overlapping costs, and a scenario in which an autonomous vehicle yields to pedestrians through stop lines and driving paths according to example embodiments of the present disclosure.

FIG. 7 depicts example aspects of autonomous vehicle behaviors, costs associated with lane boundaries and a driving path, autonomous vehicle geometry for spatiotemporal overlapping costs, and a scenario in which an autonomous vehicle yields to pedestrians through stop lines and driving paths according to example embodiments of the present disclosure. More particularly, FIG. 7 illustrates example aspects whereby given a scenario represented by situational data, the motion planning system can generate a set of possible autonomous vehicle behaviors as shown at 402. As depicted at 404, left and right lane boundaries as well as the driving path that are relevant to the intended behavior can be considered in the cost function. The geometry for spatiotemporal overlapping cost can be approximated using circles as shown at 406. As illustrated at 408, the autonomous vehicle can yield to pedestrians through stop lines on the driving path.

Consider an example where $\mathcal{W}$; denotes an input to the motion planning system, such as can be received as one or more outputs of other systems of the autonomy computing system. The input can include situational data associated with one or more upstream systems such as a perception system and/or prediction system of the machine-learned pipeline of the autonomy computing system. By way of example, the input can include situational data including a desired route of the autonomous vehicle, map data, perception data, and/or prediction data. This data can include state data associated with the autonomous vehicle as well as state data associated with detected objects, such as multiple future trajectories for each detected object including their probabilities. The motion planning system can output a high level behavioral decision b and a trajectory $\tau$ that can be executed by the autonomous vehicle for a planning horizon T (e.g., 10 s). In some examples, the high-level behavioral decision b can be defined as a driving path that the autonomous vehicle should ideally converge to and follow. The paths can be obtained by considering maneuvers such keep-lane, left-lane-change, and right-lane-change maneuvers.

Figure 8:
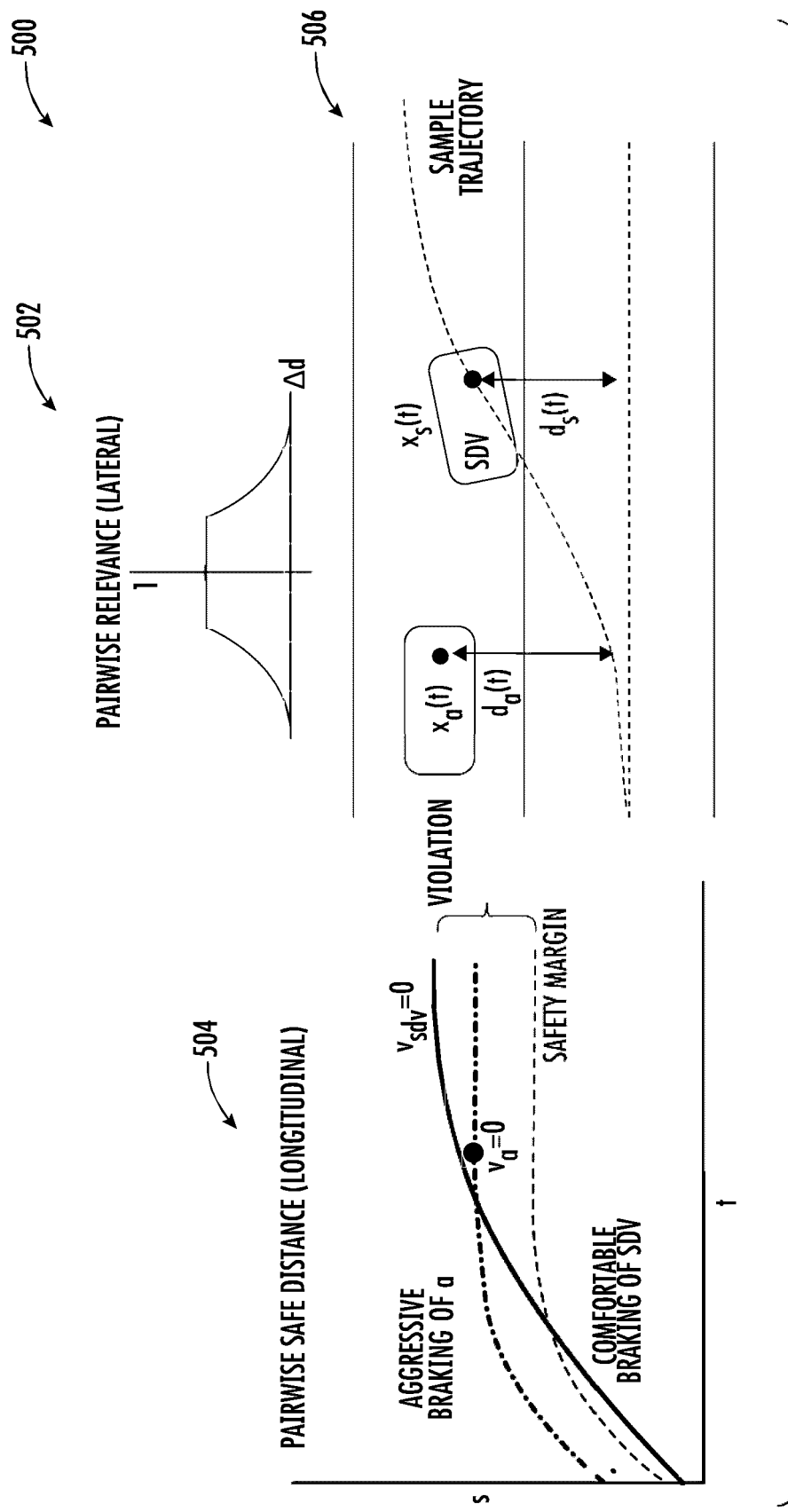
FIG. 8 depicts an example of sub-cost computations for a unified cost function according to example embodiments of the present disclosure.

FIG. 8 depicts an example of sub-cost computations for a unified cost function according to example embodiments of the present disclosure. At 502, a pairwise relevance as a function of a change in distance is illustrated. At 504, a headway cost is illustrated which can be utilized to penalize unsafe distance to a leading vehicle. At 506, for each sample trajectory, a weight function is illustrated which can be used to determine how relevant an obstacle is to the autonomous vehicle in terms of its lateral offset.

At each planning iteration of the autonomy computing system, depending on the autonomous vehicle location on the map, for example, only a subset of behaviors may be allowed due to traffic-rules, etc. This subset of behaviors, denoted as $\mathcal{B}(\mathcal{W})$, can be considered for evaluation. Low-level realizations of the high-level behaviors can be generated by generating a set of trajectories $\tau(b)$ relative to these paths. A dynamical model such as a bicycle model can be used, such as where it is assumed that the autonomous vehicle follows such a model. The state of the autonomous vehicle state at a time t can be represented by $X_t=[x_t, \theta_t, \kappa_t, v_t, \alpha_t, \dot{\kappa}]$. Here, x is the Cartesian coordinate of position; $\theta$ is the heading angle; $\kappa$ is the curvature; $v$ is the velocity; $\alpha$ is the acceleration; and $\dot{\kappa}$ is the twist (e.g., derivative of curvature). A trajectory $\tau$ can be defined as a sequence of vehicle states at discrete time steps ahead.

An objective of the planner can be defined to determine a behavior and a trajectory that is safe, comfortable, and that progresses along the route. In accordance with example embodiments, such a behavior and trajectory can be determined by minimizing a cost function that describes the desired output as set forth in Equation 1.

$$b^*, \tau^* = \underset{b \in \mathcal{B}(\mathcal{W}), t \in \mathcal{T}(b)}{\arg\min} f(\tau, b, \mathcal{W}; w) \qquad \text{Equation 1}$$

A unified cost function $f$ for the behavioral planning stage and trajectory planners can be defined. Given the sets of candidate behaviors and trajectories, the cost function $f$ is used to choose the best (b, $\tau$). The cost function consists of sub-costs c that focus on different aspects of the trajectories such as safety, comfort, feasibility, mission completion, and traffic rules. For example, the cost function can be defined as set forth in Equation 2.

$$f(\tau, b, \mathcal{W}; w) = w^\tau c(\tau, b, \mathcal{W};) \qquad \text{Equation 2}$$

In Equation 2, a weight vector w captures an importance of each sub-cost c.

By way of example, the sub-costs 354 can include one or more obstacle sub-costs that represent that a safe trajectory for the autonomous vehicle should not only be collision free, but also satisfy a safety-distance to surrounding obstacles, including both static and dynamic objects such as vehicles, pedestrians, cyclists, unknown objects, etc.

An overlap cost $c_{overlap}$ and $c_{obstacle}$ can capture the spatiotemporal overlap and violation of safety-distance respectively. For this, an autonomous vehicle polygon can be approximated by a set of circles with the same radii along the vehicle, and the distance from the center of the circles to the object polygon can be used to evaluate the cost as shown in FIG. 7 at 406. The overlap cost $c_{overlap}$ is then 1 if a trajectory violates the spatial occupancy of any obstacle in a given predicted trajectory, and is averaged across all possible trajectories weighted by the probability $p_o^i$. The obstacle cost $c_{obstacle}$ penalizes the squared distance of the violation of the safety-distance $d_{safe}$. This cost is scaled by the speed of the autonomous vehicle, making the distance violation more costly at high speeds. This also prevents accumulating cost in a stopped trajectory when other actors get too close to the autonomous vehicle.

Driving path and lane boundary cost can be defined to represent that the autonomous vehicle is expected to adhere to the structure of a road. In other words, the autonomous vehicle should not go out of the lane boundary and should remain close to the center of the lane. Sub-costs can be introduced to measure such violations. The driving-path and boundaries that are considered for these sub-costs can depend on the candidate behavior as illustrated at 404 in FIG. 7. The driving-path cost $c_{path}$ can be set to the squared distance towards the driving path (dotted lines in FIG. 7 at 404). The lane boundary cost $c_{lane}$ can be the squared violation distances of a safety threshold.

One or more headway costs can be defined to represent that an autonomous vehicle driving behind a leading vehicle in either a lane-following or a lane-change behavior should keep a safe longitudinal distance from the leading vehicle. A headway cost, for example, can be computed as a violation of a safety distance. The headway cost can be computed as the violation of the safety distance after applying a comfortable constant deceleration, assuming that the leading vehicle applies a hard brake. To compute the cost, which vehicles are leading the autonomous vehicle each time-step of the trajectory can be determined. On example approach is to associate vehicles to lanes based on distance to the centerline. This approach may be conservative and make nudging behavior difficult. Another example uses a weight function of the lateral distance between the autonomous vehicle and other vehicles to determine how relevant they are for the headway cost as shown in FIG. 8. Hence, the distance violation headway cost incurred by vehicles that are laterally aligned with the autonomous vehicle dominate the cost. This is also compatible with lane change maneuvers where deciding on the lead vehicles can be challenging.

One or more yield costs can be defined to represent that the autonomous vehicle should maintain a safe distance from pedestrians or other sensitive objects. By way of example, a stopping point can be imposed at a safe longitudinal distance as shown at 408 in FIG. 7. A yield cost can be defined that penalizes violations of the safe longitudinal distance. This can be contrasted with a simple Cartesian distance as it does not allow going around the pedestrians in order to progress in the route. The yield cost $c_{yield}$ penalizes the squared longitudinal violation distance weighted by the pedestrian prediction probability. Similarly, the autonomous vehicle can keep a safe longitudinal distance to vehicles that are predicted to be crossing an intersection, as well as stop at signal-controlled intersections. The same cost form as the pedestrian cost can be used in some examples, but with different safety margins.

One or more route costs can be defined that are associated with one or more routes represented as a sequence of lanes, from which it can be specified that all lanes are on the route or are connected to the route by permitted lane changes. A behavior can be defined that is desirable if the goal lane is closer to the route than a current lane. A number of lane changes that is required to converge to the route can be penalized. Additionally, or alternatively, violations of the distance threshold to the end of the lane can be penalized to force lane changes from dead-end lanes to lanes that the autonomous vehicle can continue on a route.

A "cost to go" sub-cost can be introduced that represents a value of a final state of the autonomous vehicle and a trajectory. For example, a "cost to go" sub-cost can cause the motion planning system to avoid choosing actions that are sub optimal beyond a planning horizon or that may take the autonomous vehicle into an inevitable unsafe situation. A cost-to-go function can capture the value of the final state of the autonomous vehicle in a trajectory. This can prevent the planner from choosing actions that are sub-optimal beyond the horizon or take the autonomous vehicle into an inevitable unsafe situation. For this purpose, a deceleration needed to slow-down to possible up-coming speed-limits can be determined and the square of the violation of the comfortable deceleration can be used as cost-to-go. Consequently, trajectories that end with high velocity close to turns or stop signs will be penalized.

Other sub-costs such as speed limit sub-costs, travel distance sub-costs, and dynamics sub-costs can be used. A speed limit sub-cost can be used to penalize trajectories that go above an eligible speed, for example. A travel distance sub-cost can be utilized in order to favor trajectories that advance in a route. A dynamics cost can be defined in order to penalize aggressive motions and to promote comfortable driving. Using the speed-limit of a lane, which is available in the map data, a cost that penalizes a trajectory if it goes above the eligible speed can be used. The speed limit cost $c_{speed}$ is the squared violation in speed. In order to favor trajectories that advance in the route, the travelled longitudinal distance can be used as a reward. Since an autonomous vehicle may be physically limited to certain ranges of acceleration, curvature, etc, trajectories that violate such constraints can be pruned. Costs can be introduced costs that penalize aggressive motions to promote comfortable driving.

According to some aspects of the present disclosure, a machine-learned motion planning system can be configured to determine a desired behavior and trajectory as one or more inferences of one or more machine-learned model. An example process of generating one or more inferences such as a behavioral decision and target trajectory is illustrated in Table 1.

TABLE 1

| | |
|---|---|
| 1: | procedure INFERENCE(w, W) |
| | ▷ The behavioral planner |
| 2: | $\tau^*, b^* \leftarrow \text{argmin}_{b \in \beta, \tau \in T(b)} f(\tau, b, W; w)$ |
| 3: | u ← TRAJECTORYFITTER($\tau^*$,b*) |
| | ▷ The trajectory planner |
| 4: | while u not converge do |
| 5: | u ← OPTIMIZERSTEP(f($T^{(T)}$(u), b*, W; w)) |
| 6: | u* ← u |
| 7: | $\tau^* \leftarrow \tau^{(T)}(u^*)$ |
| 8: | return $\tau^*$, u* |

Table 1 depicts an example of an inference process that can contain two stages of optimization. In the behavioral planning stage, a coarse-level parameterization for trajectory generation can be adopted. A resulting trajectory can be found by selecting the one with the lowest cost. In the trajectory planning stage, a fine-level parameterization can be used where the trajectory is modeled as a function of vehicle control variables. The trajectory can be initialized with the output of the behavioral planning stage, and optimized through a continuous optimization solver.

In accordance with some example embodiments, a trajectory can be represented in terms of a Frenet Frame of a driving-path of candidate behaviors. For instance, $\Gamma_\rho$ can be defined as a transformation from a dynamical model (e.g., bicycle model) state to the Frenet frame of a path ρ. Accordingly, a relationship can be defined as set forth in Equation 3.

$$[s, \dot{s}, \ddot{s}, d, d', d''] = \Gamma_\rho(X) \qquad \text{Equation 3}$$

In Equation 3, s denotes the position (e.g. arc length) along the path ρ and d is the lateral offset. The notations $$(\dot{\cdot}) := \frac{\partial}{\partial t},$$

and $$(\cdot)' := \frac{\partial}{\partial s}$$

denote the derivatives with respect to time and arc-length. The longitudinal state can be parametrized by time, while the lateral state is parametrized by the longitudinal position which may be a better representation of the coupling between the two states at relatively low speed. Given an initial vehicle state $\Gamma_{\rho b}(X_0)$, longitudinal and lateral trajectories can be generated.

Figure 9:
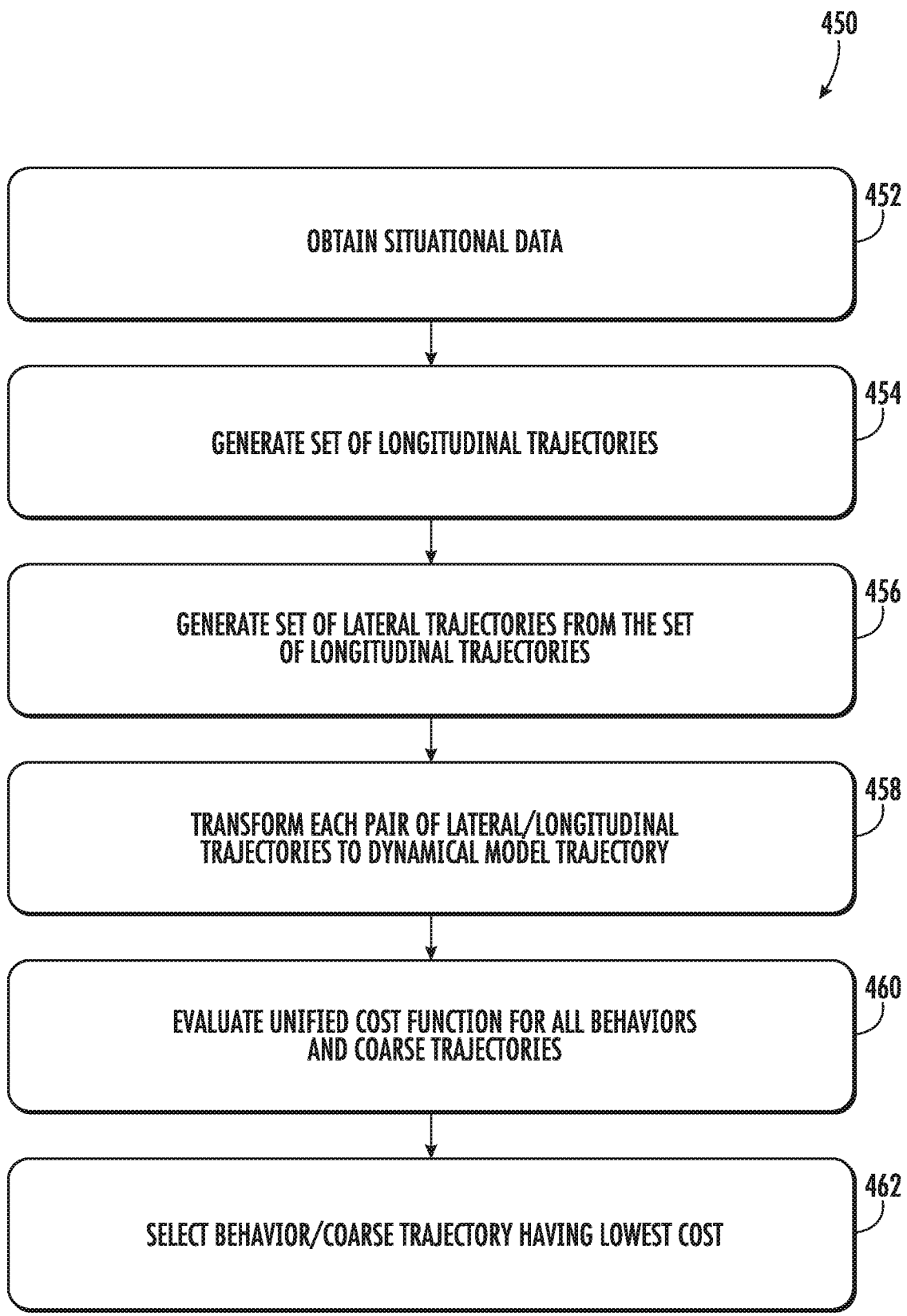
FIG. 9 depicts a flowchart illustrating an example method for generating behaviors and coarse level trajectories using a behavioral planning stage of a machine-learned motion planning system according to example embodiments of the present disclosure.

FIG. 9 depicts a flowchart illustrating an example method for generating behaviors and coarse level trajectories using a behavioral planning stage of a machine-learned motion planning system according to example embodiments of the present disclosure.

At 452, method 450 can include obtaining situational data. At 454, method 450 can include generating a set of longitudinal trajectories. In some examples, a set of longitudinal trajectories S={s(t)} can be generated by computing an exhaustive set of mid-conditions [ṡ(t₁), t₁] and end-conditions [ṡ(T), T]. The process can include solving for two quartic polynomials stitched together. An acceleration (s̈) at t₁ and T can be fixed at 0.

At 456, method 450 can include generating a set of lateral trajectories from the set of longitudinal trajectories. In some examples, a set of lateral trajectories [d(s), d'(s), d''(s)] can be parameterized in terms of the longitudinal distance s. A set of mid-conditions [d(s₁), s₁] can be generated and d'(s₁) and d''(s₁) can be fixed to be 0. The end-conditions can also be fixed to be [0, 0, 0] so that the autonomous vehicle is merged to the driving path. In some embodiments, two quintic polynomials can be stitched to fit the mid- and end-conditions.

At 458, method 450 can include transforming each pair of lateral/longitudinal trajectories to a dynamical model trajectory. To compute the dynamics cost in a discrete planner (e.g., the behavioral planning stage), each pair of sampled longitudinal and lateral trajectories [s(t), d(s)] can be transformed back to a dynamical model trajectory as set forth in Equation 4.

$$\tau = [x,\theta,\kappa,v,\alpha,\dot{\kappa}] = \Gamma_\rho^{-1}(s,\dot{s},\ddot{s},d,d',d'') \quad \text{Equation 4}$$

According to Equation 4, an optimal trajectory for a given scenario $\mathcal{W}$ can be found by evaluating the cost function $f$ for all $b \in \mathcal{W}$ and $\tau \in \mathcal{T}(b)$ and choosing the one that achieves the minimum cost.

At 460, method 450 can include evaluating a unified cost function for all behaviors and coarse trajectories. According to Equation 4, an optimal trajectory for a given scenario $\mathcal{W}$ can be found by evaluating the cost function $f$ for all $b \in \mathcal{B}(\mathcal{W})$ and $\tau \in \mathcal{T}(b)$ and choosing the one that achieves the minimum cost.

A behavioral-trajectory interface can pass an optimal behavioral decision and course level trajectory to the trajectory planning stage. The optimal behavioral decision can be encoded as the left and right lane boundaries, driving path, and obstacle side assignment, which can determine whether an obstacle stays in the front, back, left, or right to the autonomous vehicle at a time step t.

At 462, method 450 can include selecting the behavior/coarse trajectory having the lowest cost.

Figure 10:
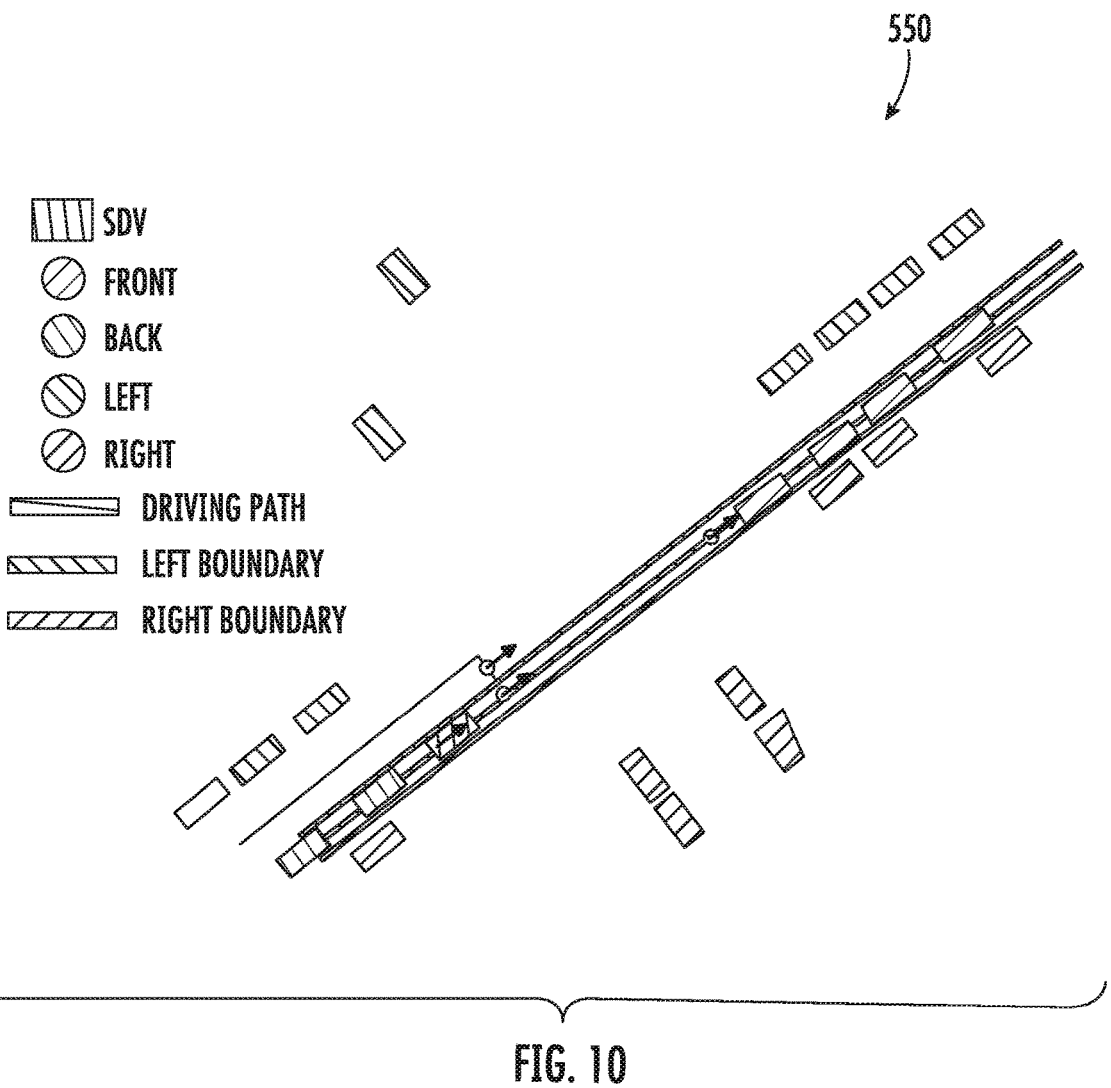
FIG. 10 depicts an example scenario including an autonomous vehicle according to example embodiments of the present disclosure.

FIG. 10 depicts an example scenario including an autonomous vehicle according to example embodiments of the present disclosure. FIG. 10 depicts an example of behavioral decisions that can include obstacle side assignment and lane information, which can be sent to the behavioral trajectory interface to be passed to the trajectory planning stage. For the continuous optimizer, spatiotemporal overlap cost $c_{overlap}$ may be incurred if the side assignment is violated at any time in the planning horizon, scaled by the squared distance of violation. This may encourage that the trajectory planner respects the discrete decision made by the discrete stage.

Figure 11:
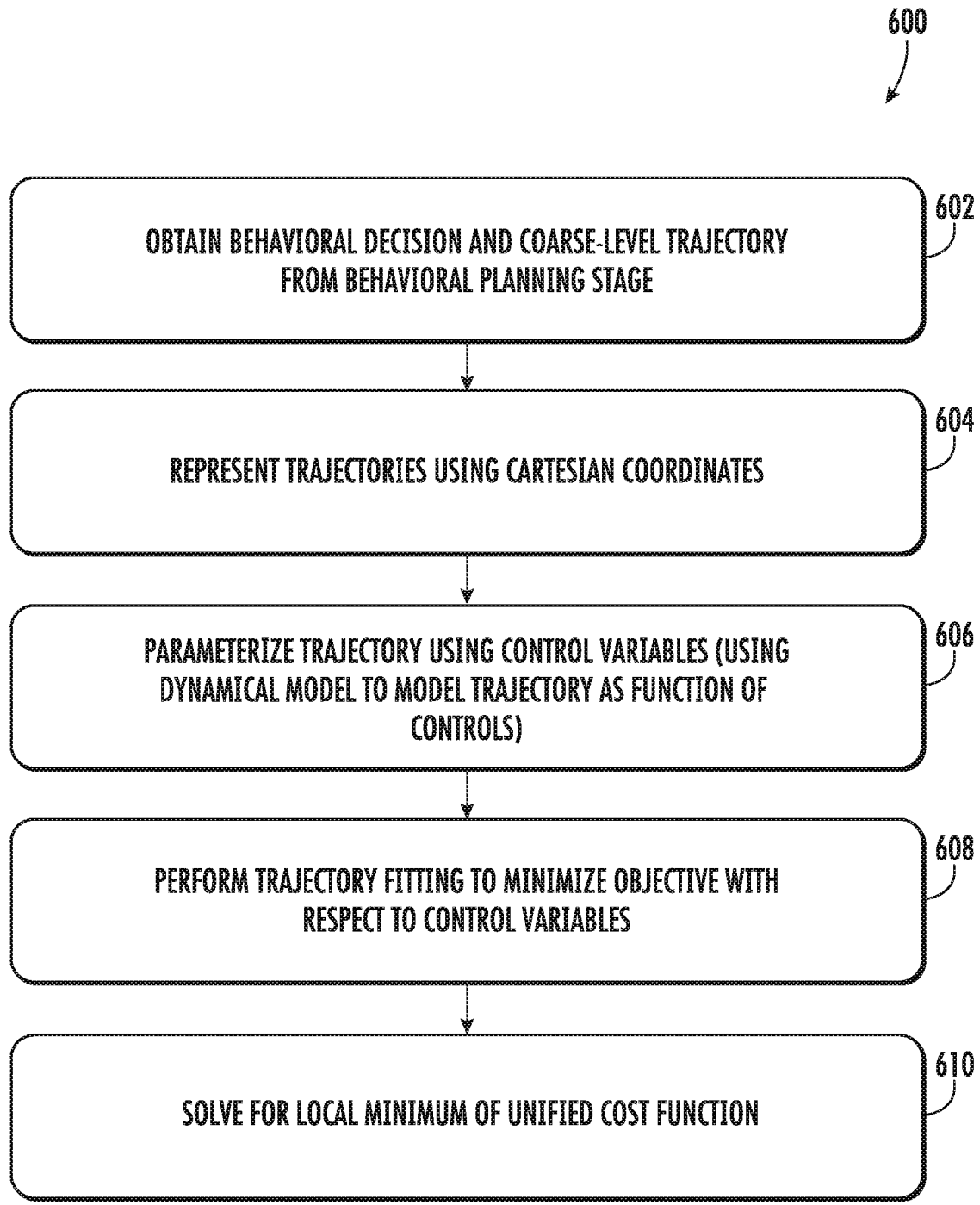
FIG. 11 depicts a flowchart illustrating an example method for generating a target trajectory for an autonomous vehicle using a trajectory planning stage of a machine-learned motion planning system according to example embodiments of the present disclosure.

FIG. 11 depicts a flowchart illustrating an example method 600 for generating a target trajectory for an autonomous vehicle using a trajectory planning stage of a machine-learned motion planning system according to example embodiments of the present disclosure.

At 602, method 600 can include obtaining behavior decision and coarse level trajectory information from the behavioral planning stage. The behavioral planning stage can pass an optimal behavioral decision b* to the trajectory planning stage. In some examples, the behavioral planning stage can additionally pass a coarse-level trajectory τ* to the trajectory planning stage. The trajectory planning stage can obtain a coarse-level trajectory τ* from other systems or locations. By way of example, the optimal behavioral decision b* can be encoded as the left and right lane boundaries, the driving path, and the obstacle side assignment, which determines whether an obstacle stays in the front, back, left, or right to the autonomous vehicle at a time step 1. For the trajectory planning stage, a spatio-temporal overlap cost $c_{overlap}$ can be incurred if the side assignment is violated at any time in the planning horizon. This cost can be scaled by the squared distance of violation in some examples which can encourage that the trajectory planning stage respects the discrete decision made by the behavioral planning stage.

At 604, one or more trajectories can be represented using Cartesian coordinates. Rather than use finite differences to estimate control parameters, which may not be precise for long range, a trajectory fitter can be used to compute the control parameters in some examples. In the trajectory planning stage, trajectories can be represented in Cartesian coordinates: $\tau = [x,\theta,\kappa,v,\alpha,\dot{\kappa}]$.

At 606, each trajectory can be parameterized using control variables. For example, a dynamical model can be used to model a trajectory as a function of controls. The trajectory τ can be parameterized using control variables. A dynamical model $\mathcal{D}$ (e.g., bicycle dynamics model) can be used to model the trajectory τ as a function of the controls as set forth in Equation 5 and Equation 6.

$$\tau_t = \mathcal{D}(t_{t-1}, u_t) \quad \text{Equation 5}$$

$$\tau = \{\mathcal{D}(t_{t-1}, u_t)\}_{t=1}^T = \tau^{(T)}(u) \quad \text{Equation 6}$$

At 608, method 600 can include performing trajectory fitting to minimize an objective with respect to control variables. In accordance with some examples, the trajectory fitter of the trajectory planning stage can minimize an objective u* with respect to the control variables as set forth in Equation 7.

$$\hat{u} = \frac{\text{argmin}}{u} \sum_{t=1}^T c_x(x(u))_t + \lambda_\theta \sum_{t=1}^t c_\theta(u)_t + \lambda_{dyn} c_{dyn} \quad \text{Equation 7}$$

In Equation 7, $c_x$ represents the squared Euclidean distance between trajectory positions and $c_\theta$ represents the orientation difference as set forth in Equation 8.

$$c_\theta(u)_t = \frac{1}{2}\left\|\begin{pmatrix}\sin\theta(u)_t\\\cos\theta(u)_t\end{pmatrix} - \begin{pmatrix}\sin\hat{\theta}_t\\\cos\hat{\theta}_t\end{pmatrix}\right\|_2^2 \quad \text{Equation 8}$$

In the above equations, $c_{dyn}$ can represent the set of costs related to vehicle dynamics. In this manner, the optimization process can be started with a physically feasible trajectory.

At 610, a solver can be utilized to solve for the local minimum of the unified cost function. Given a fitted control sequence as an initialization, a cost optimizer of the trajectory planning stage can solve for a local minimum of the overall cost function $f$ as set forth in Equation 9.

$$u^* = \underset{u}{\operatorname{argmin}} f(\tau^T(u), b^*, \mathcal{W}; w) \qquad \text{Equation 9}$$

A solver such as the BFGS solver may be used to obtain a solution to the optimization problem set forth in Equation 9.

Figure 12:
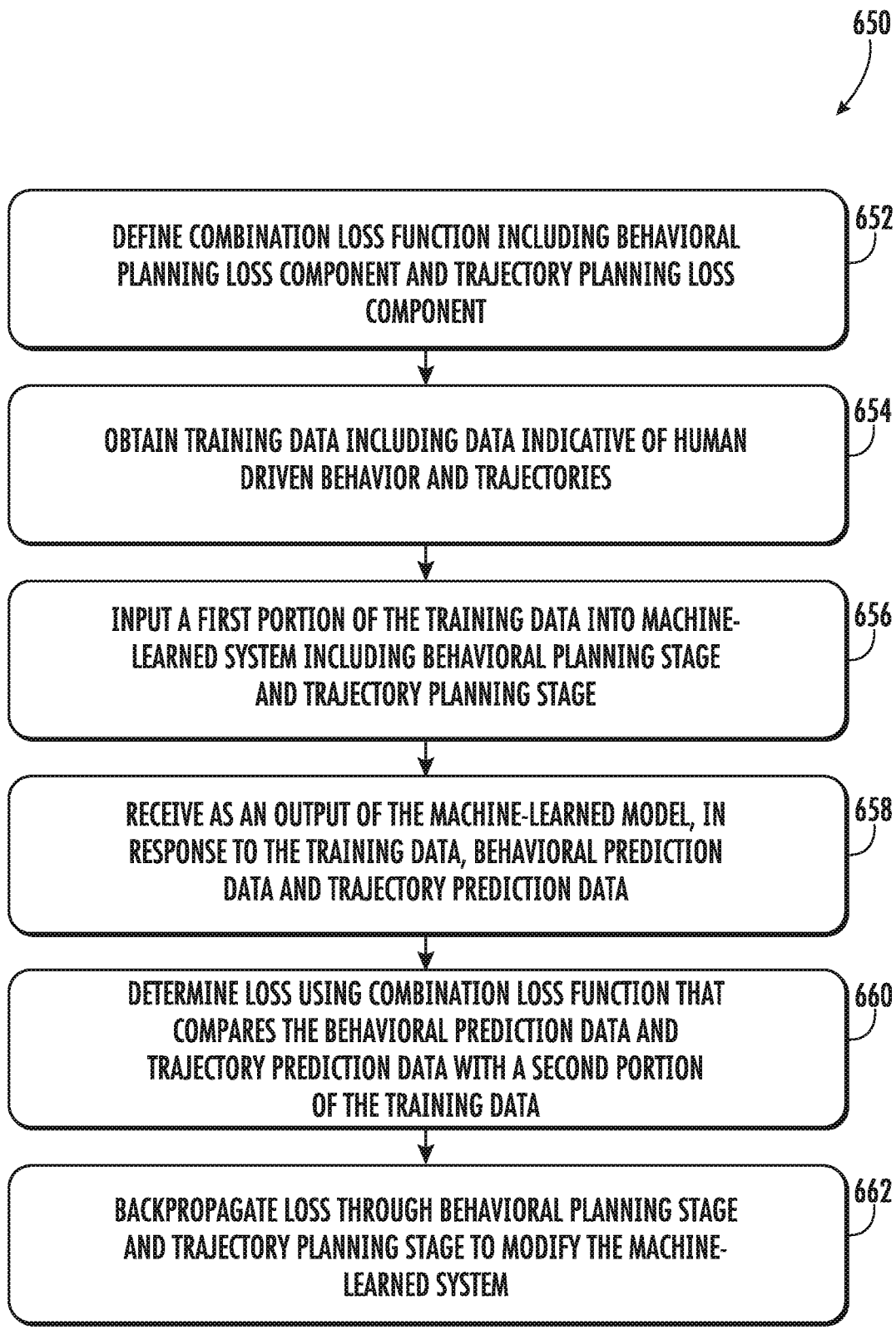
FIG. 12 depicts a flowchart diagram illustrating an example method for training a machine-learned motion planning system to generate target trajectories using a unified cost function that is learned through end to end training based on a combination loss function according to example embodiments of the present disclosure.

FIG. 12 depicts a flowchart diagram illustrating an example method 650 for training a machine-learned motion planning system to generate target trajectories using a unified cost function that is learned through end to end training based on a combination loss function according to example embodiments of the present disclosure.

At 652, method 650 can include defining a combination loss function that includes a behavioral planning loss component and a trajectory planning loss component. In some examples, the behavioral planning loss component can be a max margin loss component and the trajectory planning loss component can be an invitation learning loss component.

At 654, method 650 can include obtaining training data including data indicative of human driven behavior and trajectories. The training data can include a number of sets of ground truth data. For example, to train a machine-learned model, a training data set can include a large number of previously obtained representations of input data, as well as corresponding labels that describe corresponding outputs associated with the corresponding input data. A training data set can more particularly include a first portion of data corresponding to one or more representations of input data. The input data can, for example, be recorded or otherwise determined while a vehicle is in navigational operation and/or the like. The training dataset can further include a second portion of data corresponding to labels identifying outputs. The labels included within the second portion of data within the training dataset can be manually annotated, automatically annotated, or annotated using a combination of automatic labeling and manual labeling.

At 656, method 650 can include inputting a first portion of the training data into the machine learned system including the behavioral planning stage and the trajectory planning stage. For example, to train the model, a training computing system can input a first portion of a set of ground-truth data (e.g., the first portion of the training dataset) into the machine-learned model to be trained.

At 658, method 650 can include receiving as an output of the machine learned model, in response to the training data, behavioral prediction data and trajectory prediction data. The output of the model can include one or more inferences that predict a second portion of the set of ground-truth data. For example, in response to receipt of a first portion of a set of ground-truth data, the machine-learned model can output a target trajectory. This output of the machine-learned model can predict the remainder of the set of ground-truth data (e.g., the second portion of the training dataset).

At 660, method 650 can include determining a loss using a combination loss function that compares the behavioral prediction data and the trajectory prediction data with a second portion of the training data. One or more discrepancies between the ground truth trajectory and training examples are detected. The computing system can determine a loss function that compares the predicted inferences generated by the machine-learned model to the second portion of the set of ground-truth data. For example, after receiving such predictions, a training computing system can apply or otherwise determine a loss function that compares the inferences output by the machine-learned model to the remainder of the ground-truth data (e.g., ground-truth labels) which the model attempted to predict. In example embodiments, the loss function can be a combined loss that includes a behavioral planning loss component and a trajectory planning loss component.

At 662, the loss can be back propagated through the behavioral planning stage and the trajectory planning stage to modify the machine learned system. Backpropagation can be used to train the model to learn a unified cost function used by both the behavioral planning and the trajectory planning stages. One or more portions of the machine-learned motion planning model can be modified based on the backpropagation. For example, the machine learned motion planning model can be trained by modifying one or more weights associated with the model. This process of inputting ground-truth data, determining a loss, and backpropagating the loss through the model can be repeated numerous times as part of training the model. For example, the process can be repeated for each of numerous sets of ground-truth data provided within the training dataset.

A machine-learned motion planning system in accordance with example embodiments may be trained using a combined loss function that includes components associated with the behavioral planning stage and the trajectory planning stage. For example, a loss function $\mathcal{L}(w)$ can be defined as set forth in Equation 10.

$$\mathcal{L}(w) = \frac{\mathcal{L}_w}{w} \|w\|_2^2 + \lambda_M \mathcal{L}_M(w) + \lambda_1 \mathcal{L}_1(w) \qquad \text{Equation 10}$$

In Equation 10, $\mathcal{L}_M$ denotes the max-margin loss, $\mathcal{L}_1$ denotes the imitation learning loss, and $\lambda_M$ and $\lambda_1$ are hyperparameters that can scale the two loss components.

The max-margin learning loss can penalize trajectories that have smaller costs and are different from a human driven trajectory. For instance, $$\{(\mathcal{W}, \tau_h, b_h)\}_{i=1}^N$$

can denote a set of manual driving examples where $b_h$ and $\tau_h$ denote the ground-truth human behavior and trajectory, respectively. The machine-learned motion planning system can learn the linear weights w of the cost function $f$ using a structured support vector machine (SVM). This approach can encourage the human driving trajectory to have smaller cost than other trajectories. The max-margin loss $\mathcal{L}_M$ can be defined as set forth in Equation 11.

$$\mathcal{L}_M(w) = \frac{1}{N} \sum_{i=1}^N \bigg\{ f(\tau_{h,i}, b_{h,i}, \mathcal{W}_i; w) + \max_{b \in \mathcal{B}(\mathcal{W}_i), \tau \in \mathcal{T}(b)} \{\Delta(\tau_{h,i}, b_{h,i}, \tau, b) - f(\tau, b, \mathcal{W}_i; w)\} \bigg\}, \qquad \text{Equation 11}$$

In Equation 11, $\Delta(\tau_h, b_h, \tau, b)$ denotes a task-loss, which can measure a dissimilarity between pairs $(\tau, b)$ of trajectories and behaviors. The task loss can include an L1 distance between the positions of the trajectories, and constant offsets for any behavioral differences and undesirable outcomes. The maximization can be solved by treating the task-loss as a sub-cost in the cost function $f$. In some examples, the top K trajectories that have the maximal values can be selected.

For the imitation loss function $\mathcal{L}_I$, a mean square error (MSE) can be used for measuring the distance between positions of the human trajectory and the planner optimal trajectory, with some discounting factor $\gamma$ as set forth in Equation 12.

$$\mathcal{L}_I(w) = \frac{1}{2N} \sum_{i=1}^{N} \sum_{t=1}^{T} \gamma^t \|x_t^* - x_{h,i}\|_2^2 \qquad \text{Equation 12}$$

The overall gradient of the learning object can be written as $g = \lambda_w w + \lambda_M g_M + \lambda_I g_I$, where $g_I = \nabla_w \mathcal{L}_I$ and $g_M$ is the subgradient of $\mathcal{L}_M$, as set forth in Equation 13.

$$g_M = \frac{1}{NK} \sum_{i=1}^{N} \sum_{k=1}^{K} c(\tau_{h,i}, b_{h,i}, \mathcal{W}_i) - c(\tau_{l,k}^*, b_{l,k}^*, \mathcal{W}_i) \qquad \text{Equation 13}$$

In Equation 13, $\{\tau_k^*, b_k^*\}$ denotes K maximum violation examples and c is the sub-cost vector. The max-margin objective can use a surrogate loss to learn the sub-cost weights, since selecting the optimal trajectory within a discrete set is not differentiable. In contrast, the iterative optimization in the trajectory planner is a differentiable component, where gradients of the imitation loss function can be computed using a backpropagation through time (BPTT) algorithm. Since unrolling the full optimization can be computationally expensive, it may be unrolled only for a truncated number of steps after obtaining a solution. As shown in Line 13 of the example process depicted in Table 2, M gradient descent steps can be performed after obtaining the optimal trajectory.

TABLE 2

```
 1:  procedure LEARNING(w^(0))                              ([∇_uu² f]^(-1))
 2:  for i ← 1...N do
 3:      E_M ← GETMINIBATCH  g_M ← 0
 4:      E_I ← GETMINIBATCH, g_I ← 0
                                                         Max-margin learning
 5:      for E_j = (τ_h, b_h, W) ∈ E_M do
 6:          for b ∈ B, τ ∈ T(b) do
 7:              l_D(b, τ) ← Δ(τ_h, b_h, τ, b) − f(τ, b, W:w^(i-1))
 8:          {b_k*, τ_k*} ← top-K l_D(b,τ) s.t. b ∈ B, τ ∈ T(b)
 9:          g_M ← g_M + (1/K|E_D|) Σ_k (c_W(τ_h, b_h) − c_W(τ_k*, b_k*))
10:                                       Differestiable inference imitation learning
11:      for E_j = (τ_h, b_h, W) ∈ E_I do
12:          u_0* ← OPTIMIZE(f(τ^(T)(u), b*, W:w))
                                                         Gradient descent M steps
13:          for m ← 1...M do
14:              u_m* ← u_{m-1}* − η∇_u f(u_m*)
                                                         Backprop through time (BPTT)
15:          l_C ← (1/T) Σ_t γ^t ||x_t* − x_{h,t}||_2^2
16:          for m ← M...1 do
17:              g_I ← g_I + (1/|E_I|) ∇_u l_C(u_m*) ∇_w u_m*
18:      g ← λ_w w^(i-1) + λ_M g_M + λ_r g_r                    Sum up
         gradients
19:      w^(i) ← w^(i-1) exp(−αg)              Exp. gradient descent
20:  return w^(N)
```

The system can backpropagate through these M steps only in some examples, as illustrated at Line 16. If the control obtained from the continuous optimization converges to the optimum, then backpropagating through a truncated number of steps can include approximating the inverse Hessian ($[\nabla_{uu}^2 f]^{-1}$) at the optimum u*.

Since it may be desirable for the weights to be greater than zero, an exponentiated gradient descent update can be used on the sub-cost weights: $w^{(i+1)} = w^{(i)} \exp(-\alpha g)$, where $\propto$ is the learning rate parameter. This approach can provide an update that ensures that the learned weights are always positive.

Figure 13:
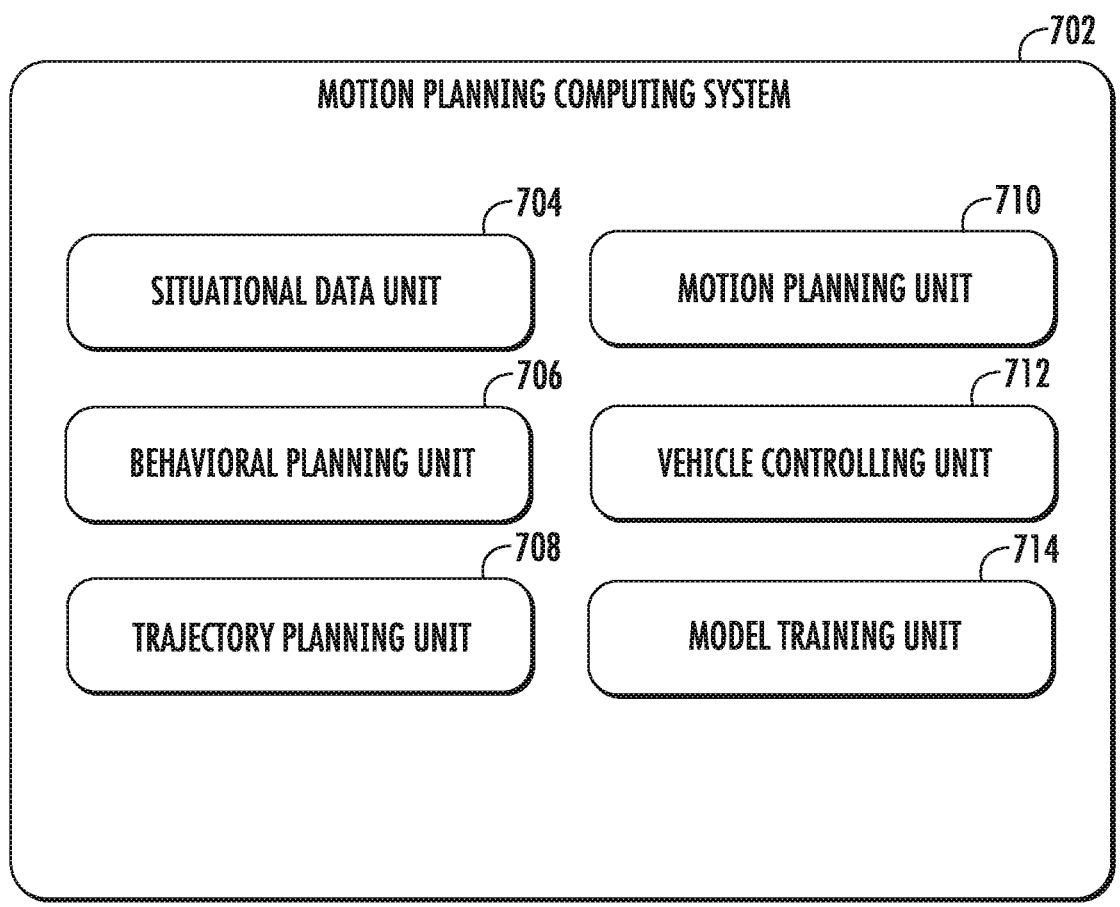
FIG. 13 depicts example system units for performing operations and functions according to example embodiments of the present disclosure.

Various means can be configured to perform the methods and processes described herein. FIG. 13 depicts an example of a computing environment including example means for performing the methods and processes described herein. FIG. 13 depicts an example motion planning computing system 702 with units 704-714 for performing operations and functions according to example embodiments of the present disclosure. For example, the motion planning computing system 702 can include one or more situational data unit(s) 704, one or more behavioral planning unit(s) 706, one or more trajectory planning unit(s) 708, one or more motion planning unit(s) 710, one or more vehicle controlling unit(s) 712, one or more model training unit(s) 714, and/or other means for performing the operations and functions described herein. In some implementations, one or more of the units 704-714 may be implemented separately. In some implementations, one or more of the units 704-714 may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. The methods (e.g., method 300, method 450, method 600, and method 650) and/or other operations described herein can be implemented as such algorithm(s).

The means can be configured to obtain situational data based at least in part on one or more outputs of a set of sensors associated with the autonomous vehicle. The situational data can include perception data, prediction data, and/or additional data in example embodiments. For example, the situational data can include a desired route for the autonomous vehicle, state data indicative of a state of the autonomous vehicle, state data indicative of the environment external to the autonomous vehicle (e.g., state data of detected objects), map data, and/or prediction data (e.g., future trajectories of detected objects). A situational data unit 704 is one example of a means for obtaining situational data such as perception data, prediction data, etc. as described herein.

The means can be configured to receive situational data based at least in part on one or more outputs of the set of sensors and to generate behavioral planning data based at least in part on the situational data and a unified cost function. The data can be indicative of at least one behavioral decision for the autonomous vehicle based at least in part on the situational data. The means can be configured to use the unified cost function to select a particular behavior given a set of candidate behaviors. Each behavior of the candidate set of behaviors can include a driving path to which the autonomous vehicle should converge and follow. The means can be configured to represent target trajectories in terms of the driving path of a corresponding candidate behavior. The means can be configured to generate longitudinal trajectories that are parameterized by time. The means can be configured to generate from the longitudinal trajectories lateral trajectories that are parameterized by a longitudinal distance. The unified cost function can comprise a plurality of sub-costs, and each sub-cost corresponds to a different one of a plurality of trajectory attributes. The means can be configured to determine at least one of the plurality of sub-costs based on the corresponding candidate behavior. The means can be configured to perform a course level parameterization for trajectory generation. A behavioral planning unit 706 is one example of a means for generating behavioral planning data as described herein.

The means can be configured to receive the behavioral planning data from the behavioral planning stage and to generate target trajectory data for the autonomous vehicle based at least in part on the behavioral planning data and the unified cost function. The means can be configured to perform a fine level parameterization where target trajectories are modeled as a function of vehicle control variables. The means can be configured to initialize the target trajectories based at least in part on an output of the behavioral planning stage and to optimize target trajectories through a continuous optimization solver. The means can be configured to generate, using a trajectory planning stage and the unified cost function of the machine learned motion planning system, target trajectory data indicative of a target trajectory for the autonomous vehicle based at least in part on the data indicative of at least one behavioral decision for the autonomous vehicle. A trajectory planning unit 708 is one example of a means for generating target trajectory data for an autonomous vehicle as described herein.

The means can be configured to generate one or more motion plans based on a target trajectory. The means can be configured to generate one or more motion plans based at least in part on a selected target trajectory. The means can be configured to determine a motion plan for the autonomous vehicle that best navigates the autonomous vehicle along a determined travel route relative to the objects at such locations. A motion planning unit 710 is one example of a means for generating motion plans as described herein. In some examples, a motion planning unit 718 can include means for receiving a target trajectory for an autonomous vehicle as an output of a machine learned motion planning model.

The means can be configured to control one or more vehicle controls (e.g., actuators or other devices that control gas flow, steering, braking, etc.) to execute the selected motion plan. A vehicle controlling unit 720 is one example of a means for controlling motion of the autonomous vehicle to execute the motion plan. In some examples, a vehicle controlling unit 720 can include means for generating one or more vehicle control signals for the autonomous vehicle based at least in part on the target trajectory.

The means can be configured to train a machine learned motion planning system including a behavioral planning stage and a trajectory planning stage using a combined loss function. The means can be configured to jointly train the behavioral planning stage and the trajectory planning stage of the machine learned motion planning system with a common objective. The means can be configured to jointly train the behavioral planning stage and the trajectory planning stage of the machine learned motion planning system using a combined loss function. The combined loss function can include a max margin loss component associated with the behavioral planning stage and an imitation learning loss component associated with the trajectory planning stage. The means can be configured to pretraining the behavioral planning stage with a max margin objective for a predetermined number of steps. The means can be configured to jointly train the behavioral planning stage and the trajectory planning stage using the combined loss function subsequent to pretraining the behavioral planning stage. The means can be configured to train the imitation learning loss component using human trajectory controls as an initialization for trajectory optimization. The max margin loss component can include a surrogate loss configured to learn sub-cost weights for the unified cost function. The means can be configured to compute one or more gradients of the imitation learning loss component using back propagation through time. The means can be configured to back propagating loss associated with one or more target trajectories to the machine learned motion planning system to jointly train the behavioral planning stage and the trajectory planning stage. A model training unit is one example of a means for training a machine learned motion planning system including a behavioral planning stage and a trajectory planning stage using a combined loss function as described herein.

Figure 14:
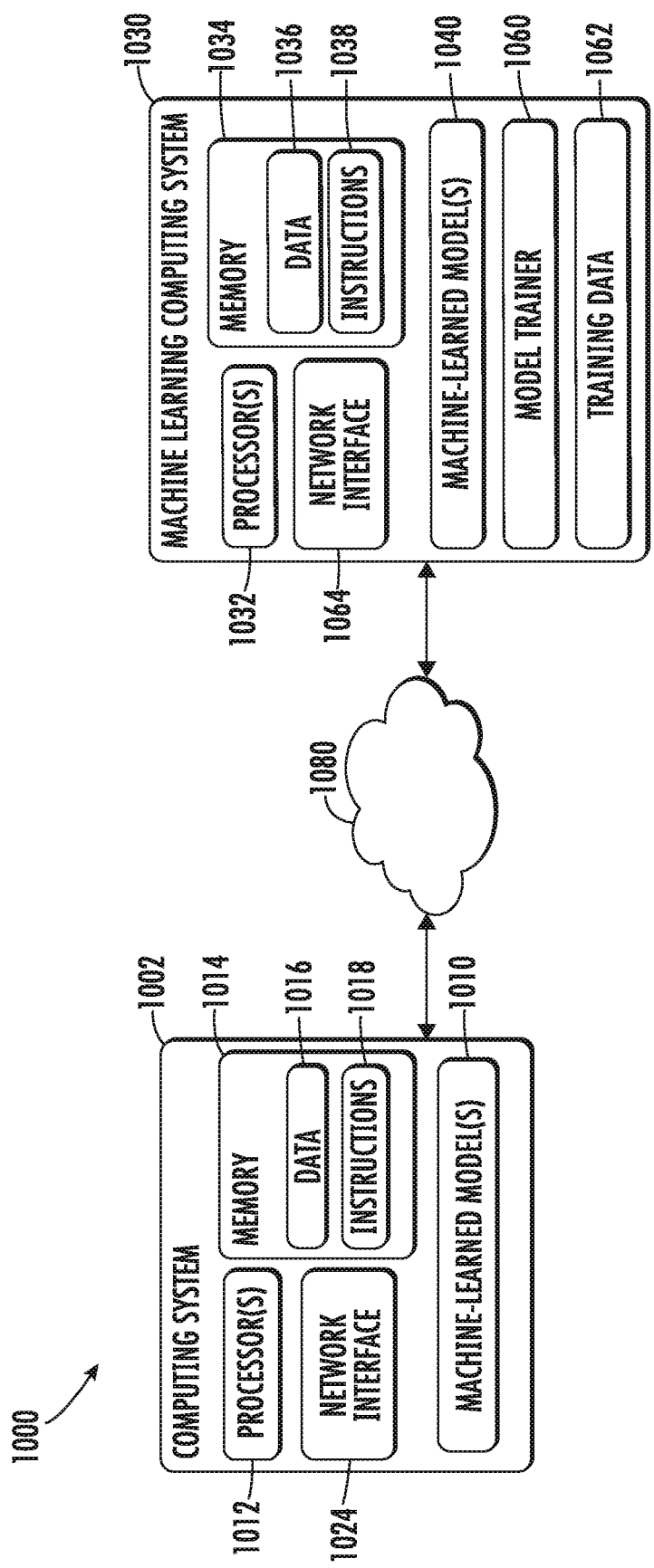
FIG. 14 depicts example system components according to example implementations of the present disclosure.

FIG. 14 depicts example system components according to example implementations of the present disclosure. The example computing system 1000 includes a computing system 1002 and a machine learning computing system 1030 that are communicatively coupled over a network 1080.

In some implementations, the computing system 1002 can perform various operations as part of motion planning for an autonomous vehicle. For example, computing system 1002 can receive sensor data map data associated with an environment external to an autonomous vehicle, and process the sensor data and the map data to generate a target trajectory for the autonomous vehicle, as part of autonomous vehicle operations. In some implementations, the computing system 1002 can be included in an autonomous vehicle. For example, the computing system 1002 can be on-board the autonomous vehicle. In some embodiments, computing system 1002 can be used to implement vehicle computing system 110. In other implementations, the computing system 1002 is not located on-board the autonomous vehicle. For example, the computing system 1002 can operate offline to obtain sensor data and perform target trajectory generation. The computing system 1002 can include one or more distinct physical computing devices.

The computing system 1002 includes one or more processors 1012 and a memory 1014. The one or more processors 1012 can be any suitable processing device (e.g., a processor core, a microprocessor, an ASIC, a FPGA, a controller, a microcontroller, etc.) and can be one processor or a plurality of processors that are operatively connected. The memory 1014 can include one or more non-transitory computer-readable storage media, such as RAM, ROM, EEPROM, EPROM, one or more memory devices, flash memory devices, etc., and combinations thereof.

The memory 1014 can store information that can be accessed by the one or more processors 1012. For instance, the memory 1014 (e.g., one or more non-transitory computer-readable storage mediums, memory devices) can store data 1016 that can be obtained, received, accessed, written, manipulated, created, and/or stored. The data 1016 can include, for instance, map data, image or other sensor data captured by one or more sensors, machine-learned models, etc. as described herein. In some implementations, the computing system 1002 can obtain data from one or more memory device(s) that are remote from the computing system 1002.

The memory 1014 can also store computer-readable instructions 1018 that can be executed by the one or more processors 1012. The instructions 1018 can be software written in any suitable programming language or can be implemented in hardware. Additionally, or alternatively, the instructions 1018 can be executed in logically and/or virtually separate threads on processor(s) 1012.

For example, the memory 1014 can store instructions 1018 that when executed by the one or more processors 1012 cause the one or more processors 1012 to perform any of the operations and/or functions described herein, including, for example, generating motion plans including target trajectories for an autonomous vehicle, etc.

According to an aspect of the present disclosure, the computing system 1002 can store or include one or more machine-learned models 1010. As examples, the machine-learned models 1010 can be or can otherwise include various machine-learned models such as, for example, neural networks (e.g., deep neural networks or other types of models including linear models and/or non-linear models. Example neural networks include feed-forward neural networks, recurrent neural networks (e.g., long short-term memory recurrent neural networks), convolutional neural networks, or other forms of neural networks.

In some implementations, the computing system 1002 can receive the one or more machine-learned models 1010 from the machine learning computing system 1030 over network 1080 and can store the one or more machine-learned models 1010 in the memory 1014. The computing system 1002 can then use or otherwise implement the one or more machine-learned models 1010 (e.g., by processor(s) 1012). In particular, the computing system 1002 can implement the machine-learned model(s) 1010 to generate uncertainty data for object detections, predictions, and motion plan generation based on sensor data.

The machine learning computing system 1030 includes one or more processors 1032 and a memory 1034. The one or more processors 1032 can be any suitable processing device (e.g., a processor core, a microprocessor, an ASIC, a FPGA, a controller, a microcontroller, etc.) and can be one processor or a plurality of processors that are operatively connected. The memory 1034 can include one or more non-transitory computer-readable storage media, such as RAM, ROM, EEPROM, EPROM, one or more memory devices, flash memory devices, etc., and combinations thereof. In some embodiments, machine learning computing system 1030 can be used to implement vehicle computing system 110.

The memory 1034 can store information that can be accessed by the one or more processors 1032. For instance, the memory 1034 (e.g., one or more non-transitory computer-readable storage mediums, memory devices) can store data 1036 that can be obtained, received, accessed, written, manipulated, created, and/or stored. The data 1036 can include, for instance, machine-learned models, sensor data, and map data as described herein. In some implementations, the machine learning computing system 1030 can obtain data from one or more memory device(s) that are remote from the machine learning computing system 1030.

The memory 1034 can also store computer-readable instructions 1038 that can be executed by the one or more processors 1032. The instructions 1038 can be software written in any suitable programming language or can be implemented in hardware. Additionally, or alternatively, the instructions 1038 can be executed in logically and/or virtually separate threads on processor(s) 1032.

For example, the memory 1034 can store instructions 1038 that when executed by the one or more processors 1032 cause the one or more processors 1032 to perform any of the operations and/or functions described herein, including, for example, generating motion plans including target trajectories for an autonomous vehicle, and controlling an autonomous vehicle based on the target trajectories.

In some implementations, the machine learning computing system 1030 includes one or more server computing devices. If the machine learning computing system 1030 includes multiple server computing devices, such server computing devices can operate according to various computing architectures, including, for example, sequential computing architectures, parallel computing architectures, or some combination thereof.

In addition or alternatively to the machine-learned model(s) 1010 at the computing system 1002, the machine learning computing system 1030 can include one or more machine-learned models 1040. As examples, the machine-learned models 1040 can be or can otherwise include various machine-learned models such as, for example, neural networks (e.g., deep neural networks) or other types of models including linear models and/or non-linear models. Example neural networks include feed-forward neural networks, recurrent neural networks (e.g., long short-term memory recurrent neural networks), convolutional neural networks, or other forms of neural networks.

As an example, the machine learning computing system 1030 can communicate with the computing system 1002 according to a client-server relationship. For example, the machine learning computing system 1030 can implement the machine-learned models 1040 to provide a web service to the computing system 1002. For example, the web service can generate motion plans including target trajectories in response to sensor data and/or other data received from an autonomous vehicle.

Thus, machine-learned models 1010 can located and used at the computing system 1002 and/or machine-learned models 1040 can be located and used at the machine learning computing system 1030.

In some implementations, the machine learning computing system 1030 and/or the computing system 1002 can train the machine-learned models 1010 and/or 1040 through use of a model trainer 1060. The model trainer 1060 can train the machine-learned models 1010 and/or 1040 using one or more training or learning algorithms. One example training technique is backwards propagation of errors. In some implementations, the model trainer 1060 can perform supervised training techniques using a set of labeled training data. In other implementations, the model trainer 1060 can perform unsupervised training techniques using a set of unlabeled training data. The model trainer 1060 can perform a number of generalization techniques to improve the generalization capability of the models being trained. Generalization techniques include weight decays, dropouts, or other techniques.

In particular, the model trainer 1060 can train a machine-learned model 1010 and/or 1040 based on a set of training data 1062. The training data 1062 can include, for example, ground truth data including annotations for sensor data portions and/or vehicle state data. The model trainer 1060 can be implemented in hardware, firmware, and/or software controlling one or more processors.

In some examples, the model trainer 1060 can train a machine-learned model 1010 and/or 1040 configured to generate motion plans including target trajectories as well as intermediate representations associated with one or more of an object detection or an object prediction. In some examples, the machine-learned model 1010 and/or 1040 is trained using sensor data that has been labeled or otherwise annotated as having a correspondence to a detected object, a class of a detected object, etc. By way of example, sensor data collected in association with a particular class of object can be labeled to indicate that it corresponds to an object detection or the particular class. In some instances, the label may be a simple annotation that the sensor data corresponds to a positive training dataset.

The computing system 1002 can also include a network interface 1024 used to communicate with one or more systems or devices, including systems or devices that are remotely located from the computing system 1002. The network interface 1024 can include any circuits, components, software, etc. for communicating with one or more networks (e.g., 1080). In some implementations, the network interface 1024 can include, for example, one or more of a communications controller, receiver, transceiver, transmitter, port, conductors, software and/or hardware for communicating data. Similarly, the machine learning computing system 1030 can include a network interface 1064.

The network(s) 1080 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 1080 can be accomplished, for instance, via a network interface using any type of protocol, protection scheme, encoding, format, packaging, etc.

FIG. 14 illustrates one example computing system 1000 that can be used to implement the present disclosure. Other computing systems can be used as well. For example, in some implementations, the computing system 1002 can include the model trainer 1060 and the training data 1062. In such implementations, the machine-learned models 1010 can be both trained and used locally at the computing system 1002. As another example, in some implementations, the computing system 1002 is not connected to other computing systems.

In addition, components illustrated and/or discussed as being included in one of the computing systems 1002 or 1030 can instead be included in another of the computing systems 1002 or 1030. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

Computing tasks discussed herein as being performed at computing device(s) remote from the autonomous vehicle can instead be performed at the autonomous vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An autonomous vehicle, comprising:
   a plurality of sensors configured to generate one or more outputs based at least in part on an environment external to the autonomous vehicle;
   one or more processors; and
   one or more non-transitory computer-readable media that store:
   a machine-learned motion planning system comprising one or more machine-learned models configured to generate target trajectories for the autonomous vehicle, the machine-learned motion planning system comprising a behavioral planning stage, a trajectory planning stage, and a unified cost function, the unified cost function comprising at least one weight vector that was jointly optimized by jointly training the behavioral planning stage and the trajectory planning stage; and
   instructions that are executable by the one or more processors to cause the one or more processors to perform operations, the operations comprising:
   obtaining situational data associated with the environment external to the autonomous vehicle;
   generating, by the behavioral planning stage of the machine-learned motion planning system, behavioral planning data indicative of at least one behavioral planning decision based at least in part on the situational data and the unified cost function, wherein the behavioral planning stage uses the unified cost function to generate the behavioral planning data; and
   generating, by the trajectory planning stage of the machine-learned motion planning system, target trajectory data indicative of at least one target trajectory based at least in part on the behavioral planning data and the unified cost function, wherein the trajectory planning stage uses the unified cost function to generate the target trajectory data.

2. The autonomous vehicle of claim 1, wherein:
   the behavioral planning stage uses the unified cost function to select a particular behavior given a plurality of candidate behaviors and the trajectory planning stage uses the unified cost function to select a particular trajectory given a plurality of candidate trajectories.

3. The autonomous vehicle of claim 2, wherein:
the plurality of candidate behaviors respectively include a driving-path to which the autonomous vehicle should converge and follow.

4. The autonomous vehicle of claim 3, wherein:
the behavioral planning stage represents target trajectories in terms of the driving-path of a corresponding candidate behavior;
the behavioral planning stage generates longitudinal trajectories that are parameterized by time; and
the behavioral planning stage generates, from the longitudinal trajectories, lateral trajectories that are parameterized by a longitudinal distance.

5. The autonomous vehicle of claim 4, wherein:
the unified cost function comprises a plurality of sub-costs respectively corresponding to a different one of a plurality of trajectory attributes; and
at least one of the plurality of sub-costs is determined based on the corresponding candidate behavior.

6. The autonomous vehicle of claim 1, wherein:
the behavioral planning stage includes a coarse-level parameterization for trajectory generation; and
the trajectory planning stage includes a fine-level parameterization where target trajectories are modeled as a function of vehicle control variables.

7. The autonomous vehicle of claim 1, wherein:
the trajectory planning stage initializes the target trajectories based at least in part on an output of the behavioral planning stage and optimizes the target trajectories through a continuous optimization solver.

8. The autonomous vehicle of claim 1, wherein:
the situational data comprises at least one of perception data or prediction data.

9. The autonomous vehicle of claim 1, wherein the situational data comprises at least one of: data indicative of at least one desired route, data indicative of at least one object detection, data indicative of a least one object state, data indicative of an autonomous vehicle state, or map data.

10. The autonomous vehicle of claim 1, wherein the at least one weight vector respectively weights at least one sub-cost of the unified cost function.

11. The autonomous vehicle of claim 1, wherein:
the behavioral planning stage and the trajectory planning stage of the machine-learned motion planning system are jointly trained using a combined loss function.

12. The autonomous vehicle of claim 11, wherein the combined loss function comprises a max-margin loss component associated with the behavioral planning stage and an imitation learning loss component associated with the trajectory planning stage.

13. The autonomous vehicle of claim 12, wherein:
the behavioral planning stage is pre-trained with a max-margin objective for a predetermined number of steps; and
subsequent to pre-training the behavioral planning stage, the behavioral planning stage and the trajectory planning stage are jointly trained using the combined loss function.

14. The autonomous vehicle of claim 13, wherein:
the imitation learning loss component is trained using human trajectory controls as an initialization for trajectory optimization.

15. The autonomous vehicle of claim 12, wherein:
the max-margin loss component comprises a surrogate loss configured to learn sub-cost weights for the unified cost function; and
one or more gradients of the imitation learning loss component are computed using backpropagation through time.

16. A computer-implemented method of motion planning for an autonomous vehicle, the method comprising:
obtaining situational data associated with an environment detected by one or more sensors of the autonomous vehicle;
generating, by a behavioral planning stage of a machine-learned motion planning system, behavioral planning data indicative of at least one behavioral decision for the autonomous vehicle based at least in part on the situational data, wherein the behavioral planning stage uses a unified cost function to generate the behavioral planning data;
generating, by a trajectory planning stage of the machine-learned motion planning system, target trajectory data indicative of a target trajectory for the autonomous vehicle based at least in part on the data indicative of at least one behavioral decision for the autonomous vehicle, wherein the trajectory planning stage uses the unified cost function to generate the target trajectory data; and
generating one or more motion plans based on the target trajectory;
wherein the unified cost function comprises at least one weight vector that was jointly optimized by jointly training the behavioral planning stage and the trajectory planning stage.

17. The computer-implemented method of claim 16, wherein:
the unified cost function is a shared cost function that is learned by the machine-learned motion planning system by training the behavioral planning stage and the trajectory planning stage end to end using a combined loss function.

18. The computer-implemented method of claim 17, wherein the combined loss function comprises a max-margin loss component associated with the behavioral planning stage and an imitation learning loss component associated with the trajectory planning stage.

19. A computing system, comprising:
a machine-learned motion planning system configured to:
obtain situational data based at least in part on one or more outputs of a set of sensors of an autonomous vehicle; and
based at least in part on the situational data,
generate a behavioral decision using a behavioral planning stage that uses a unified cost function to generate the behavioral decision; and
output a target trajectory for the autonomous vehicle using a trajectory planning stage that uses the unified cost function to output the target trajectory;
one or more processors; and
one or more non-transitory computer-readable media that store instructions that are executable to cause the one or more processors to perform operations, the operations comprising:
inputting, to the machine-learned motion planning system, training data including annotated sensor data indicating ground truth vehicle trajectories;
determining a loss associated with one or more target trajectories generated by the machine-learned motion planning system relative to the annotated sensor data based at least in part on a combined loss function including a first loss component associated with the behavioral planning stage and a second loss component associated with the trajectory planning stage; and backpropagating the loss associated with the one or more target trajectories to the machine-learned motion planning system to learn at least one weight vector of the unified cost function for the behavioral planning stage and the trajectory planning stage.

20. The computing system of claim 19, wherein:

the first loss component includes a max-margin loss; and
the second loss component includes an imitation learning loss.

\* \* \* \* \*